(12) United States Patent
Mark

(10) Patent No.: US 11,986,883 B2
(45) Date of Patent: May 21, 2024

(54) BLUE LASER METAL ADDITIVE MANUFACTURING SYSTEM

(71) Applicant: Nuburu, Inc., Centennial, CO (US)

(72) Inventor: Zediker Mark, Castle Rock, CO (US)

(73) Assignee: Nuburu Subsidiary, Inc., Centennial, CO (US)

( * ) Notice: Subject to any disclaimer, the term of this patent is extended or adjusted under 35 U.S.C. 154(b) by 454 days.

(21) Appl. No.: 17/092,061

(22) Filed: Nov. 6, 2020

(65) Prior Publication Data

US 2021/0323071 A1 Oct. 21, 2021

Related U.S. Application Data

(63) Continuation-in-part of application No. 16/550,216, filed on Aug. 24, 2019, and a continuation-in-part of application No. 15/884,672, filed on Jan. 31, 2018, now Pat. No. 10,940,562, and a continuation-in-part of application No. 15/581,494, filed on Apr. 28, 2017.

(Continued)

(51) Int. Cl.
| | |
|---|---|
| *B22F 12/43* | (2021.01) |
| *B22F 10/12* | (2021.01) |
| *B22F 12/17* | (2021.01) |
| *B22F 12/20* | (2021.01) |
| *B23K 26/06* | (2014.01) |
| *B33Y 10/00* | (2015.01) |
| *B33Y 70/00* | (2020.01) |

(52) U.S. Cl.
CPC .............. *B22F 12/43* (2021.01); *B22F 10/12* (2021.01); *B22F 12/17* (2021.01); *B22F 12/20* (2021.01); *B23K 26/0643* (2013.01); *B33Y 10/00* (2014.12); *B33Y 70/00* (2014.12); *B22F 2201/10* (2013.01); *B22F 2301/052* (2013.01); *B22F 2301/255* (2013.01); *B23K 26/0648* (2013.01)

(58) Field of Classification Search
CPC .......... B22F 10/12; B22F 10/28; B22F 10/36; B22F 10/362; B22F 10/366; B22F 10/80; B22F 12/17; B22F 12/20; B22F 12/33; B22F 12/43; B22F 12/45; B22F 2201/10; B22F 2301/052; B22F 2301/255; B23K 26/0643; B23K 26/0648; B29C 64/153; B29C 64/268; B29C 64/277; B29C 64/295; B33Y 10/00; B33Y 30/00; B33Y 70/00; Y02P 10/25
USPC ..................................................... 219/121.61
See application file for complete search history.

(56) References Cited

U.S. PATENT DOCUMENTS

| | | | |
|---|---|---|---|
| 7,938,543 B2 * | 5/2011 | Gerets ..................... | G03B 21/16 353/52 |
| 10,940,536 B2 * | 3/2021 | Zediker .............. | B23K 26/0853 |

(Continued)

*Primary Examiner* — Dana Ross
*Assistant Examiner* — Joseph W Iskra
(74) *Attorney, Agent, or Firm* — Glen P. Belvis; Belvis Law, LLC.

(57) ABSTRACT

A high-resolution additive manufacturing system and method using a Digital Mirror Device and having image segments that make up an image of an entire object and are projected to the target area to deliver a working laser beam in the image of the entirety of the object to be built. A method and system for additive manufacturing using a DMD in the laser beam path. The use of a pre-heat laser beam in combination with a build laser beam having a DMD along the build laser beam path.

60 Claims, 17 Drawing Sheets

Related U.S. Application Data

(60) Provisional application No. 62/931,734, filed on Nov. 6, 2019, provisional application No. 62/726,233, filed on Sep. 1, 2018, provisional application No. 62/722,198, filed on Aug. 24, 2018, provisional application No. 62/452,598, filed on Jan. 31, 2017, provisional application No. 62/329,786, filed on Apr. 29, 2016.

(56) References Cited

U.S. PATENT DOCUMENTS

| | | | |
|---|---|---|---|
| 2016/0114431 A1* | 4/2016 | Cheverton | B22F 10/31 219/76.1 |
| 2018/0065186 A1* | 3/2018 | Cullinan | H01L 21/67115 |

* cited by examiner ns, and can have movement of tilt from its axis to off axis
BLUE LASER METAL ADDITIVE MANUFACTURING SYSTEM This application: (i) claims under 35 U.S.C. § 119(e)(1) the benefit of the filing date of, and claims the benefit of priority to, U.S. provisional application Ser. No. 62/931,734 filed Nov. 6, 2019; (ii) is a continuation-in-part of U.S. patent application Ser. No. 16/550,216 filed Aug. 24, 2019, which claims under 35 U.S.C. § 119(e)(1) the benefit of the filing date of, and claims the benefit of priority to, US provisional application Ser. No. 62/722,198 filed Aug. 24, 2018 and US provisional application Ser. No. 62/726,233 filed Sep. 1, 2018; (iii) is a continuation-in-part of U.S. patent application Ser. No. 15/581,494 filed Apr. 28, 2017, which claims under 35 U.S.C. § 119(e)(1) the benefit of the filing date of U.S. provisional application Ser. No. 62/329,786 filed Apr. 29, 2016; and (iv) is a continuation-in-part of U.S. patent application Ser. No. 15/884,672 filed Jan. 31, 2018, which claims under 35 U.S.C. § 119(e)(1) the benefit of the filing date of U.S. provisional application Ser. No. 62/452,598 filed Jan. 31, 2017, the entire disclosure of each of which are incorporated herein by reference.

BACKGROUND OF THE INVENTION

Field of the Invention

The present inventions relate to laser processing of materials and in particular laser building of materials including laser additive manufacturing processes using laser beams having wavelengths from about 350 nm to about 700 nm.

Infrared red (IR) based (e.g., having wavelengths greater than 700 nm, and in particular wavelengths greater than 1,000 nm) additive manufacturing systems suffer from, among other things, two short comings, which limit both the build volume and the build speed. In these IR systems the build volume is limited by the finite size of the scanning systems and the spot that can be created for a given focal length collimator and f-theta lens. For example, in such prior IR systems, when using a 14 mm focal length collimator and a 500 mm F-theta focal length lens the spot size is on the order of 350 µm for a diffraction limited IR laser beam. This gives an addressable foot print on the raw build material, e.g., a powder bed, of approximately 85 mm×85 mm, which in turn creates or establishes the finite limitation on the build volume for that given resolution (e.g., spot size). The second limitation on the build speed for IR laser systems is the absorption of the laser beam by the materials. While originally, most raw build materials had a modest to low reflectivity for wavelengths in the infrared spectrum, as additivity manufacturing started to use metals, such as gold, silver, platinum, copper and aluminum and alloys thereof, which materials have high and very high IR reflectivity, problems were encountered with using these high reflective IR types of build materials in IR additive manufacturing. As a consequence, the coupling of the infrared laser energy into the raw build materials, e.g., powder bed or particles, is limited with a significant portion of the energy being reflected away, backward or deeper into the raw build material. These limitations are in a way further tied or linked together, compounding the problems and deficiencies of IR additive systems. Thus, the finite penetration depth of the Infrared laser light determines the optimum layer thickness and as a consequence, limits the resolution of the process. Thus, IR laser systems, because of their reflectivity to the typical raw build material have limited layer thicknesses and thus limited resolution.

As used herein, unless expressly stated otherwise, "UV", "ultra violet", "UV spectrum", and "UV portion of the spectrum" and similar terms, should be given their broadest meaning, and would include light in the wavelengths of from about 10 nm to about 400 nm, and from 10 nm to 400 nm.

As used herein, unless expressly stated otherwise, the terms "visible", "visible spectrum", and "visible portion of the spectrum" and similar terms, should be given their broadest meaning, and would include light in the wavelengths of from about 380 nm to about 750 nm, and 400 nm to 700 nm.

As used herein, unless expressly stated otherwise, the terms "blue laser beams", "blue lasers" and "blue" should be given their broadest meaning, and in general refer to systems that provide laser beams, laser beams, laser sources, e.g., lasers and diodes lasers, that provide, e.g., propagate, a laser beam, or light having a wavelength from 400 nm (nanometer) to 500 nm, and about 400 nm to about 500 nm. Blue lasers include wavelengths of 450 nm, of about 450 nm, of 460 nm, of about 460 nm. Blue lasers can have bandwidths of from about 10 pm (picometer) to about 10 nm, about 5 nm, about 10 nm and about 20 nm, as well as greater and smaller values.

As used herein, unless expressly stated otherwise, the terms "green laser beams", "green lasers" and "green" should be given their broadest meaning, and in general refer to systems that provide laser beams, laser beams, laser sources, e.g., lasers and diodes lasers, that provide, e.g., propagate, a laser beam, or light having a wavelength from 500 nm to 575 nm, about 500 nm to about 575 nm. Green lasers include wavelengths of 515 nm, of about 515 nm, of 532 nm, about 532 nm, of 550 nm, and of about 550 nm. Green lasers can have bandwidths of from about 10 pm to 10 nm, about 5 nm, about 10 nm and about 20 nm, as well as greater and smaller values.

As used herein, unless specified otherwise, the term "Digital Mirror Device" is to be given its broadest possible meaning and would include any device, including deformable mirrors, that can direct or redirect a laser beam by changing the properties, surface features, surface contours and both, of a reflective, refractive and both surface, to direct or redirect light, including a laser beam. The term Digital Mirror Devices include Digital Micromirror Device ("DMD") and Micro-Electro-Mechanical-System ("MEMS").

As used herein, unless specified otherwise, the terms "DMD", "Digital Micromirror Device", "Micro-Electro-Mechanical-System" "MEMS" and similar such terms are to be given their broadest possible meaning and would generally include devices that have a large number of small reflective surfaces, e.g., mirrors, that are movable or positionable. Generally, the small reflective surfaces have for example a square, diamond, rectangular, circular or oval shape, and have a cross section (largest cross section) of from about 1 µm to about 50 µm, typically about 5 µm to about 25 µm, and can specifically be about 5 µm, about 10 µm, about 15 µm, larger and smaller sizes may also be used. These devices can have: from about 10 to about 1,000,0000 movable reflective surfaces, or more; tens, hundreds and thousands, and tens of thousands of movable reflective surfaces; from about 100,000 to about 700,000 movable reflective surfaces; about 200,000 to about 500,000 movable reflective surfaces; and typically, hundreds of thousands of the movable reflective surfaces. Generally, each of the reflective surfaces has an individually controllable tilt degree of freedom, and can have two, three or more positions, and can have movement of tilt from its axis to off axis by about ±5 degrees to about ±25 degrees, and typically about ±10 degrees to ±15 degrees, ±10 degrees, ±12 degrees and ±15 degrees.

As used herein, unless specified otherwise, the terms "non-macro-mechanical motion beam steering" device or system, means a device or system that does not use or have a macro-mechanical motion beam steering device, to direct the laser beam and specifically does not use a galvo-mirror, gimbal, fast-steering mirror, Risley prism or rotating polygon to direct the laser beam.

Generally, the term "about" and the symbol "~" as used herein, unless specified otherwise, is meant to encompass a variance or range of ±10%, the experimental or instrument error associated with obtaining the stated value, and preferably the larger of these.

As used herein, unless stated otherwise, room temperature is 25° C. And, standard ambient temperature and pressure is 25° C. and 1 atmosphere. Unless expressly stated otherwise all tests, test results, physical properties, and values that are temperature dependent, pressure dependent, or both, are provided at standard ambient temperature and pressure, this would include viscosities.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

Typically, a method employed today in additive manufacturing is the use of an infrared laser and a galvanometer to scan the laser beam across the surface of a powder bed in a predetermined pattern. The IR laser beam is of sufficient intensity to create a keyhole welding process that melts and fuses the liquified powder to the lower layer or substrate. This approach has several limitations that determines the speed of the process. For example, a single laser beam is used to scan the surface and the build rate is limited by the maximum scanning speed of the galvanometers (7 m/sec). Manufactures strongly embrace IR technology, and typically believe that it is the only viable wavelength, thus they are working, but with limited success, to overcome this limitation by integrating two or more IR laser/galvanometers into a system, where the two can work in conjunction to build a single part or they can work independently to build parts in parallel. These efforts are aimed at improving the throughput of the additive manufacturing systems, but have been focused solely on IR and have been of limited success, not meeting the long felt need for improved additive manufacturing.

An example of another limitation in IR processing is the finite volume that can be addressed by the IR laser/galvanometer system. In a stationary head system the build volume is defined by the focal length of the f-theta lens, the scanning angle of the galvanometer, the wavelength of the IR laser and the beam quality of the infrared laser. For example, with a 500 mm F-theta lens the IR laser creates a spot size on the order of 50 µm for a diffraction limited infrared laser. If the laser beam is operating at 100 Watts optical power, then the intensity of the beam is greater than the intensity required to initiate a keyhole welding mode. The keyhole welding mode creates a plume of vaporized material that must be removed out of the path of the laser beam by a cross jet otherwise the laser beam is scattered and absorbed by the vaporized metal. In addition, because the keyhole mode of welding relies on creating a hole in the liquid metal surface that is maintained by the vapor pressure of the vaporized metal, material other than vaporized metal can be ejected from the keyhole. This material is referred to as spatter and results in molten materials being deposited elsewhere on the build plane that can lead to defects in the final part. While the manufactures of additive manufacturing systems have had some limited success in developing rapid prototyping machines, they have failed to meet the long felt need, and achieve the requirements needed to produce commercial or actual parts in volume. To accomplish this a breakthrough in the method of patterning the parts, which prior to the present inventions the art has not achieved.

In general, a problem and failing with IR processing and systems is the requirement or need to fuse the powder in a keyhole welding mode. This can be typically because of the use of a single beam to process the powder. If the laser beam is operating at 100 Watts optical power, then the intensity of the beam is greater than the intensity required to initiate a keyhole welding mode. The keyhole welding mode creates a plume of vaporized material that must be removed out of the path of the laser beam by a cross jet otherwise the laser beam is scattered and absorbed by the vaporized metal. In addition, because the keyhole mode of welding relies on creating a hole in the liquid metal surface that is maintained by the vapor pressure of the vaporized metal, material such as the vaporized metal can be ejected from the keyhole. This material is referred to as spatter and results in molten materials being deposited elsewhere on the build plane that can lead to defects in the final part.

Recent work by Lawrence Livermore National Laboratories using an Optically Activated Light Valve (OALV) has been attempted to address these IR limitations. The OALV is a high-power spatial light modulator that is used to create a light pattern using high power lasers. While the pattern on the OALV is created with a blue LED or laser source from a projector, the output power from the four laser diode arrays are transmitted through the spatial light modulator and used to heat the image to the melting point and a Q-switched IR laser is required to initiate a keyhole weld. The IR laser is used in the keyhole mode to initiate the weld, especially when fusing copper or aluminum materials, and is generally required for these materials. This keyhole weld process typically creates spatter, porosity in the part, as well as high surface roughness. Thus, the OALV systems as do typical IR systems does not eliminate the adverse effects of keyhole initiation of the building process. While it would be better to completely avoid the keyhole welding step, the art has failed to overcome this problem and has not provided this solution. This failure has primarily occurred because at the IR wavelengths the absorption properties of many metals are so low that a high peak power laser is necessary to initiate the process. Since the OALV is only transparent in the IR region of the spectrum, it is not feasible to build, or use this type of system using a visible laser source as the high energy light source. The cost of the components in this system are very high especially the OALV which is a custom unit.

Prior metal based additive manufacturing machines are very limited in that they are either based on a binder being sprayed into a powder bed followed by a consolidation step at high temperatures, or a high-power single mode laser beam scanned over the powder bed by a galvanometer system at high speeds. Both of these systems have significant fallings that the art has been unable to overcome. The first system is capable of high volume manufacturing of parts with loose tolerances due to the shrinkage of the parts during the consolidation process. The second process is limited in build speed by the scan speeds of the galvanometer limiting the maximum power level laser that can be used and consequently, the build rate. Builders of scanning based additive manufacturing systems have worked to overcome this limitation by building machines with multiple scan heads and laser systems, which has not provided an adequate solution to these problems. This does indeed increase the throughput, but the scaling law is linear, in other words a system with two laser scanners can only build twice as many parts as a system with one scanner or build a single part twice as fast. Thus, there is a need for a high throughput, laser-based metal additive manufacturing system that does not suffer from the limitations of the currently available systems.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

The present inventions solve these and other problems with IR additive manufacturing systems and process, and address these and other long felt needs, as well as future needs as additive manufacturing process and systems achieve greater prevalence. The present inventions, among other things, solve these problems and needs by providing the articles of manufacture, devices and processes taught, and disclosed herein.

Thus, there is provided an additive manufacturing system for metals, the system having: a laser source, for providing a working laser beam; a Digital Mirror Device in optical communication with the laser source, whereby the laser source can propagate the working laser beam along a first laser beam path to the Digital Mirror Device; a control system, in control communication with a memory device; in control communication with a GUI; in control communication with the Digital Mirror Device; in control communication with the laser source; and, in control communication with a stage; the memory device comprising a plurality of image segments of an entire image of an object to be built; the stage comprising a motor and the Digital Mirror Device; wherein the Digital Mirror Device is configured to project the working laser beam in a predetermined pattern along a second laser beam path to a target area, wherein the target area comprises a powder; wherein the predetermined pattern comprises the image segments; the control system comprising instructions, wherein the instructions synchronize the movement of the stage and the projection of the image segments to the target area; whereby the image segments are projected to the target area to deliver the working laser beam in the image of the entirety of the object to be built; thereby building the object from the powder.

Further there is provided these systems, device and methods having one or more of the following features: wherein the Digital Mirror Device is selected from the group consisting of a Digital Micromirror Device and Micro-Electro-Mechanical-System; wherein the working laser beam has a wavelength of in the range of 300 nm-800 nm; wherein the working laser beam has a wavelength of in the range of 300-600 nm; wherein the working laser beam has a wavelength of in the range of 400-500 nm; wherein the working laser beam has a wavelength of in the range of 500-600 nm; wherein the Digital Mirror Device is air cooled; wherein the Digital Mirror Device is cooled by a cooling device selected from the group consisting of a micro-channel cooler, water heat exchanger, and a Peltier cooler; having zonal radiant heaters for maintain the build chamber temperature; having a heated build plate; having a separate secondary laser for heating the powder bed only where the pattern will be illuminated; having an inert atmosphere; wherein the predetermined patter has a multi-kW power density; wherein the system is non-macro-mechanical motion beam steering system; and, wherein the metal powder is selected from the group consisting of gold, silver, platinum, copper and aluminum and alloys thereof.

Yet further, there is provide the method of operating any of these systems to build an object from a metal powder.

Moreover there is provided a 3-D systems using a spatial light modulator, an array of spatial light modulators and both to form an energy pattern on a powder bed to either directly fuse a plastic or nylon material or to simply control the temperature of the zone to just below the melt point of the region where the primary laser is about to be scanned. It is theorized that the reason for considering this approach is to improve the energy efficiency of the system. At present either a radiant heater, a zone radiant heat or a build plate temperature control system is used to pre-heat the entire bead to be processed. By reducing the size of the region to be pre-heated, the overall energy consumption of the system can be reduced.

Further, an embodiment of the present inventions are based on using a Digital Mirror Device spatial light modulator, an array of Digital Mirror Devices and both assumes that the power density must be limited to 100 W/cm$^2$ or less when operating in a continuous mode which is sufficient to melt and flow plastics but insufficient to melt and fuse metals.

There is provided an additive manufacturing system for metals that uses a laser and a spatial light modulator, an array of spatial light modulators and both to form an energy pattern on a powder metal layer that is fused to the layer below, a gantry system to step and repeat the image across the powder bed, a motion control system, an elevator to displace the part down as each layer is fused, and a powder distribution system that can both spread the powder and compact it before fusing, and an air tight build chamber.

Moreover, there is provided these lasers, systems and methods having one or more of the following features: a laser in the wavelength range of 300-400 nm; a laser in the wavelength range of 400-500 nm; a laser in the wavelength range of 500-600 nm; a laser in the wavelength range of 600-800 nm; an infrared laser in the range of 800 nm-2000 nm; the laser is homogenized by a light pipe, micro-lens homogenizer, a diffractive element and combinations and variations of these; the laser is time shared between multiple print heads or multiple printer systems; the spatial light modulator is a Digital Micromirror Device ("DMD") array which is an array of micromirrors; the spatial light modulator is any of a class of spatial light modulator capable of handling multi-W to multi-kW power levels; the DMD is air cooled; the DMD is water cooled; the DMD is water cooled by a water cooler such as a micro-channel cooler; the DMD is cooled by a Peltier cooler; includes zonal radiant heaters for maintaining the build chamber temperature; includes a heated build plate; includes a pyrometer or a FLIR camera to monitor or control the build plate temperature; includes a thermocouple or RTD embedded in the build plate to monitor or control the temperature of the build plate; includes software for determining the optimum build strategy; includes a separate secondary laser for heating the powder bed only where the pattern will be illuminated; uses an inert atmosphere for the part build; uses an inert atmosphere for keeping the optics in the system clean; and wherein the laser-spatial modulator combination creates and image on the powder bed that has a multi-kW/cm² power density which is required for fusing metals.

Moreover, there is provided an additive manufacturing system for metals that uses a laser and a spatial light modulator, an array of spatial light modulators, and both to form an energy pattern on a powder metal layer that is fused to the layer below, by for example, using a conduction mode welding process with the aid of a second laser to pre-heat the powder bed, a gantry system to step and repeat the image across the powder bed, to continuously print the image by scrolling the image across the DMD synchronized with the movement of the head, the bed and both to provide a time, and preferably a greater amount of time to melt the powder, a motion control system an elevator to displace the part down as each layer is fused, and a powder distribution system that can both spread the powder and compact it before fusing, and an air tight build chamber.

Further, there is provided these systems and methods having the feature of the build plate include any number of metal materials, including aluminum, anodized aluminum, titanium, steel, stainless steel, nickel, copper, combinations of these, as well as, any other material which may be the same material as the powder or different.

Still further, there is provided these lasers, systems and methods having one or more of the following features: wherein the laser is approximately a 450 nm blue laser; wherein the laser is in the wavelength range of 300-400 nm; wherein the laser is in the wavelength range of 400-500 nm; wherein the laser is in the wavelength range of 500-600 nm; wherein the laser is in the wavelength range of 600-800 nm; wherein the laser is an infrared laser in the range of 800 nm-2000 nm; wherein the laser is homogenized by either a light pipe or micro-lens homogenizer; wherein the laser can be time shared between multiple print heads or multiple printer systems; wherein there is a secondary laser; wherein the secondary laser is a 450 nm blue laser; wherein the second laser is in the wavelength range of 300-400 nm; wherein the secondary laser is in the wavelength range of 400-500 nm; wherein the secondary laser is in the wavelength range of 500-600 nm; wherein the secondary laser is in the wavelength range of 600-800 nm; wherein the secondary laser is an infrared laser in the range of 800 nm-2000 nm; is homogenized by either a light pipe, micro-lens homogenizer or a diffractive optical element; wherein the secondary laser is time shared between multiple print heads or multiple printer systems; wherein the system has a spatial light modulator; wherein the spatial light modulator is a Digital Micromirror Device ("DMD"); wherein the spatial light modulator is any of a class of spatial light modulator capable of handling multi-Watts to multi-kW power levels; wherein the system includes zonal radiant heaters for maintain the build chamber temperature; wherein the system includes a heated build plate; wherein the system includes a pyrometer or a FLIR camera to monitor or control the build plate temperature; wherein the system includes a thermocouple or RTD embedded in the build plate to monitor or control the temperature of the build plate; wherein the system includes software for determining the optimum build strategy; wherein the system uses an inert atmosphere for the part build; wherein the system uses an inert atmosphere for keeping the optics in the system clean; wherein the system includes a laser-spatial modulator combination that creates and image on the powder bed that has a multi-Watt to multi-kWatt power density.

Moreover, there is provided these lasers, systems and methods having one or more of the following features: having a second laser, wherein in the second laser is used for preheat in the system and creates and region overlapping the image of the spatial-filter laser system on the powder bed that has a multi-Watt to multi-kWatt power density; and, wherein laser system has a powder bed that has a multi-Watt to multi-kWatt power density.

Yet further, there is provided an additive manufacturing system for metals that uses a laser and a spatial light modulator to form a pattern on a powder metal layer that is fused to the layer below, a gantry system to step and repeat the image across the powder bed, a motion control system, an elevator to displace the part down as each layer is fused, and a powder distribution system that can both spread the powder and compact it before fusing, and an air tight build chamber.

Additionally, there is provided these systems, subsystems and methods having one or more of the following features: wherein the laser is in the wavelength of a 450 nm blue laser; wherein the laser has a wavelength range of 300-400 nm; wherein the laser has a wavelength range of 400-500 nm; wherein the laser has a wavelength range of 500-600 nm; wherein the laser has a wavelength range of 600-800 nm; wherein the laser is an infrared laser in the range of 800 nm-2,000 nm; wherein the laser is homogenized by either a light pipe or micro-lens homogenizer; wherein the laser is time shared between multiple print heads or multiple printer systems; wherein the spatial light modulator is a Digital Micromirror Device ("DMD") array which is an array of micromirrors; wherein the spatial light modulator is any of a class of spatial light modulator capable of handling multi-W to multi-kW power levels; wherein the DMD is air cooled; wherein the DMD is water cooled by a water heat exchanger such as a micro-channel cooler; wherein the laser is the DMD is cooled by a Peltier cooler; wherein the system includes zonal radiant heaters for maintain the build chamber temperature; wherein the system includes a heated build plate; wherein the system includes a pyrometer or a FLIR camera to monitor or control the build plate temperature; wherein the system includes a thermocouple or RTD embedded in the build plate to monitor or control the temperature of the build plate; wherein the system includes software for determining the optimum build strategy; wherein the system of claim 1 that includes a separate secondary laser for heating the powder bed only where the pattern will be illuminated; wherein the system uses an inert atmosphere for the part build; wherein the system uses an inert atmosphere for keeping the optics in the system clean; and wherein the laser-spatial modulator combination of the system creates and image on the powder bed that has a multi-kW power density.

Yet further there is provided an additive manufacturing system for metals that uses a laser and a spatial light modulator to form a pattern on a powder metal layer that is fused to the layer below with the aid of a second laser to pre-heat the powder bed, a gantry system to step and repeat the image across the powder bed, a motion control system an elevator to displace the part down as each layer is fused, and a powder distribution system that can both spread the powder and compact it before fusing, and an air tight build chamber.

Still further there is provided an additive manufacturing system for metals that uses multiple lasers and multiple spatial light modulators to form a single larger pattern on a powder metal layer that is fused to the layer below, a gantry system to step and repeat the image across the powder bed, a motion control system, an elevator to displace the part down as each layer is fused, and a powder distribution system that can both spread the powder and compact it before fusing, and an air tight build chamber.

Moreover there is provided an additive manufacturing system for metals that uses multiple lasers and multiple spatial light modulators to form a checkboard pattern of images and non-images on a powder metal layer that is fused to the layer below, a gantry system to step and repeat the image across the powder bed, a motion control system, an elevator to displace the part down as each layer is fused, and a powder distribution system that can both spread the powder and compact it before fusing, and an air tight build chamber.

Yet further there is provided a laser spatial-light modulator combination that creates an image and moves the image across the DMD to create a stationary image on the moving gantry system to extend the exposure time for printing the pattern in the material being fused. Still further there is provided an additive manufacturing system for forming metal objects from metal powders, the system having: a laser source to provide a build laser beam along a build laser beam path; a heating means for heating a metal powder; a Digital Micromirror Device ("DMD") on the laser beam path, whereby the build laser beam is directed into the DMD, wherein the DMD creates a 2-D image pattern that is reflected from the DMD along the laser beam path to an optical assembly; and, the optical assembly directing the laser beam to the metal powder, whereby the 2-D image pattern is delivered to the metal powder.

Additionally, there is provided these systems, subsystems and methods having one or more of the following features: wherein the heating means is selected from the group consisting of electric heaters, radiant heaters, IR heaters and a laser beam; wherein the heating means is a laser beam having a wave length in the blue wave length range; wherein the metal powder forms a bed of metal powder; wherein the laser beam has a wave length select from the group consisting of blue and green; wherein the laser beam has a wave length selected from the group consisting of about 450 nm, about 460 nm, about 515 nm, about 532 and about 550 nm; wherein the laser source has a power of about 1 kW to about 20 kW; wherein and the 2-D image delivers a peak power density to the metal powder of from about 2 kW/cm$^2$ to about 5 kW/cm$^2$; wherein the DMD has maximum average power density level; and wherein the peak power density level of the 2-D image on the metal powder is at least 500× greater than the maximum average power density level of the DMD; wherein the DMD has maximum average power density level; and wherein the peak power density level of the 2-D image on the metal powder is at least 1,000× greater than the maximum average power density level of the DMD; wherein the heating means is configured to heat the powder to within 200° C. of a melting point of the metal powder; wherein the heating means is configured to heat the powder to within 100° C. of a melting point of the metal powder; wherein the heating means is configured to heat the powder to about 400° C. of a melting point of the metal powder; wherein the heating means is configured to heat the powder to about 600° C. of a melting point of the metal powder; wherein the heating means is configured to heat the powder to about 400° C. of a melting point of the metal powder and maintain the powder at that temperature; wherein the heating means is configured to heat the powder to about 600° C. of a melting point of the metal powder and maintain the powder at that temperature; wherein the heating means is configured to heat the powder to within 200° C. of a melting point of the metal powder and maintain the powder at that temperature; having a second laser source to provide a second build laser beam along a second build laser beam path; a second Digital Micromirror Device ("DMD") on the second laser beam path, whereby the second build laser beam is directed into the second DMD, wherein the second DMD creates a second 2-D image pattern that is reflected from the second DMD along the second laser beam path to a second optical assembly; wherein the 2-D image pattern is delivered to a first area of the metal powder, and the second 2-D image pattern is delivered to a second area of the metal powder; wherein the first area and the second area are different; and, wherein the first area and the second area are adjacent.

Additionally, there is provided these systems, subsystems and methods having one or more of the following features: wherein the DMD array is optimized for wavelengths in at least one of the following wavelengths: the blue wavelength range, 400 nm, about 440 nm, 450 nm, and about 450 nm, 460 nm and about 460 nm, the green wavelength range, 515 nm, about 515 nm, 532 nm, about 532 nm, and the red wavelength range of 600 nm to 700 nm.

Additionally, there is provided these systems, subsystems and methods having one or more of the following features: wherein the build laser beam has a wavelength selected from at least one of the following wavelengths: the blue wavelength range, 400 nm, about 440 nm, 450 nm, and about 450 nm, 460 nm and about 460 nm, the green wavelength range, 515 nm, about 515 nm, 532 nm, about 532 nm, and the red wavelength range of 600 nm to 700 nm.

Yet further there is provided an additive manufacturing system for forming metal objects from metal powders, the system having: a laser source to provide a build laser beam along a build laser beam path; a second laser source for providing a heating laser beam; a Digital Micromirror Device ("DMD") on the laser beam path, whereby the build laser beam is directed into the DMD, wherein the DMD creates a image that is reflected from the DMD along the laser beam path to an optical assembly; and, the optical assembly directing the laser beam to the metal powder, whereby the image is delivered to the metal powder.

Still further there is provided a laser spatial-light modulator combination that projects a 2-D pattern onto a powder bed with an optimized grey scale in time or in the pattern, such that the heat manipulates the molten puddle into the desired build shape yielding sharper transitions and denser parts.

DESCRIPTION OF THE PREFERRED EMBODIMENTS

In general, the present inventions relate to laser processing of materials, laser processing by matching preselected laser beam wavelengths to the material to be processed to have high or increased levels of absorptivity by the materials, systems configurations that provide for greater speed, efficiency and size of objects that are built, and in particular laser additive manufacture of raw materials into large structures, parts, components and articles with laser beams having high absorptivity by starting raw materials.

In an embodiment of a Digital Mirror Device based printing system, an image is scrolled across the target as the stage having the Digital Mirror Device moves. In this embodiment a 3-D image of an object, e.g., a part such as a copper part, is provided to the system. The image, preferably is a 3-D digital image or bit map of the part to be built. This 3-D image is segmented into a series of layers, and other sections. The image segments are contained in a storage device associate with the controller and control system for the printing system. The image segments are ordered in accordance with the movement (e.g., x direction, horizontal direction) of the stage. The stage contains the Digital Mirror Device, in optical communication with the laser source. The images are then played back in a predetermined manner in accordance with the movement of the stage, i.e., the image play back is synchronized with the stage movement. In this manner as the synchronized image slices are delivered to the build material, e.g., copper powder, to the build object in shape of the original 3-D image.

Thus, although not being restricted by this analogy, the Digital Mirror Device is seen as playing the image segments back over the build material as the stage is moved to form the build material into the shape of the original 3-D image.

Figure 12A:
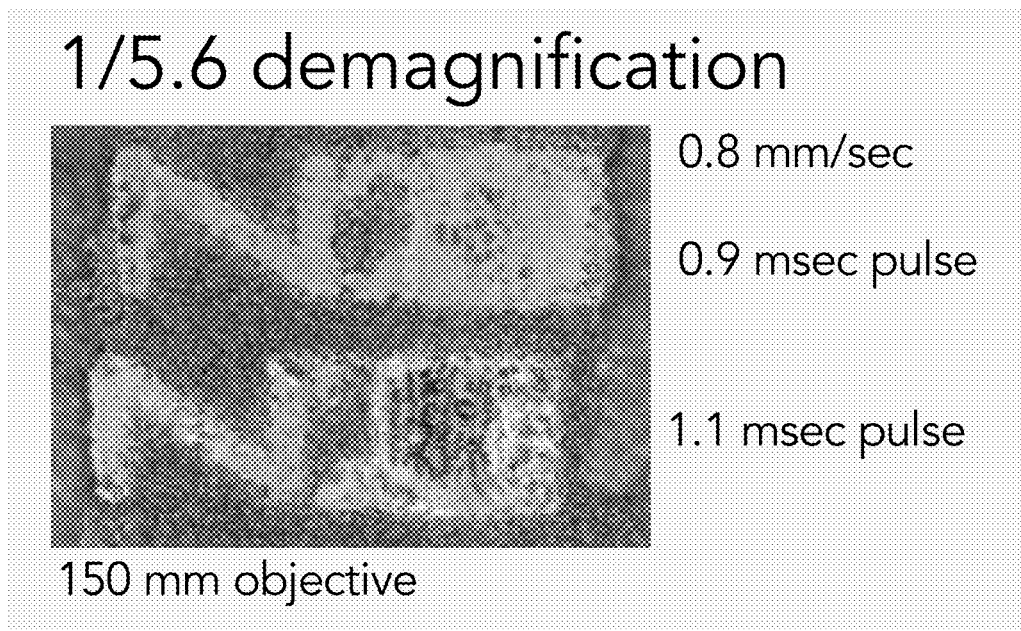
FIGS. 12A and 12B are photographs of embodiments of built patterns form a powder starting material, at various power density on the powder bed to achieve a good melt and reproduction of the image in the metal in accordance with the present inventions.
Figure 12B:
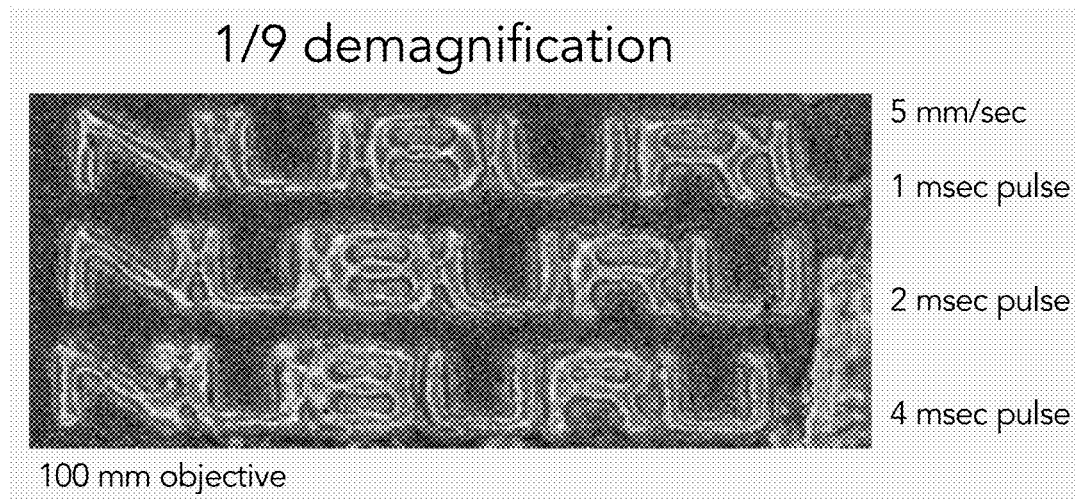

FIGS. 12A and 12B illustrate examples of the role of having the proper power density on the powder bed plays in having good melt and reproduction of the image in the metal. The build object is a series of raised copper letters.

The built object of FIG. 12A was built using a 150 mm objective focal lens, which provided a 1/5.6 demagnification of the image. The speed of the stage movement in the x direction, and the two different laser pulse lengths, are shown on the right side of the photo.

The built object of FIG. 12B was built using a 100 mm objective focal lens, which provided a ⅑ demagnification of the image. The speed of the stage movement in the x direction, and the three different laser pulse lengths, are shown on the right side of the photo. 800×600 pixels of the DMD were used to build the objects of FIGS. 12A and 12B. The smallest feature printed is 0.1 mm wide. The height of the letters in FIG. 12B is about 0.65 mm.

A comparison of FIGS. 12A and 12B shows that the higher power density used in FIG. 12B results in better speed and quality of the built object (e.g., tolerances). The shorter focal length lens increases the intensity of the laser image on the build material. The shorter focal length lens can, reduce or eliminate, in some embodiments, the need for a pre-heat step, e.g., a pre-heat laser. The shorter focal length lens can provide a 4×, 5×, 6× or more improvement in the speed and quality of the build object over longer length focal lens.

In embodiments of the system the preferred focal length of the focusing lens, which in embodiments is placed after the laser beam is leaving the Digital Mirror Device, as a laser pattern, can be about 100 mm, from about 50 mm to about 150, and larger and smaller lengths.

Figure 13A:
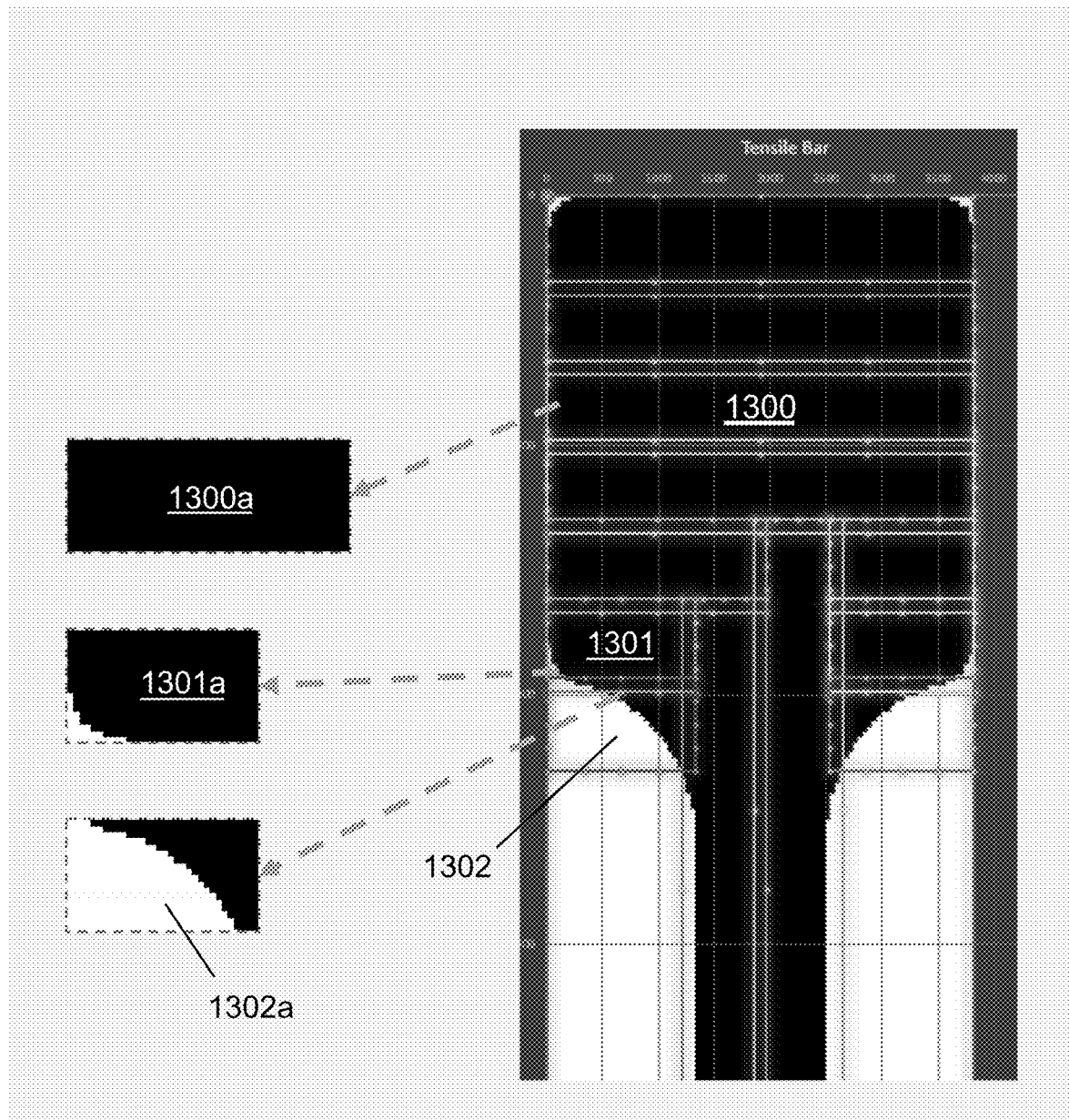
FIG. 13A is an embodiment of the image slicing used to map a single layer of part that is printed directly in copper in accordance with the present inventions.
Figure 13B:
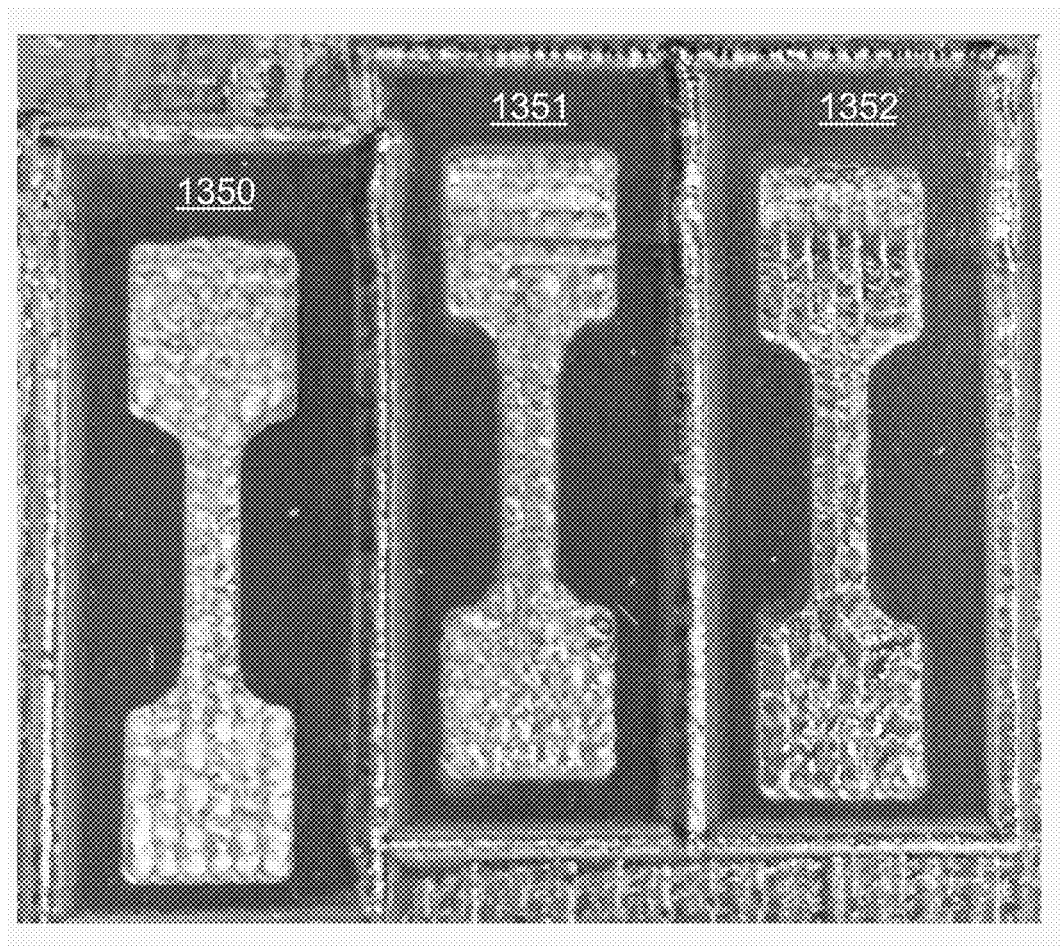
FIG. 13B is are photographs of an embodiment of the copper part build in using the mapping of FIG. 13A in accordance with the present inventions.

FIGS. 13A and 13B illustrate an example of the image slicing used to map a single layer of part that is printed directly in copper. In FIG. 13A the image of a tensile bar (only upper portion is shown) is divided into a number of different image segments. Thus, for example section 1300 of the image corresponds to image segment 1300a, section 1301 corresponds to image segment 1301a, and section 1302 corresponds to image segment 1302a.

FIG. 13B is a photograph of the tensile bar built from scrolling the image segments as a laser beam pattern in a synchronized manner with the movement of the stage on to the build material. Image 1350 is of a layer of the tensile bar built along an axis. Image 1351 is of a layer of the tensile bar built along an axis. Image 1352 is of a layer of the tensile bar built along an axis. The part can be built along the long axis, the short axis, a transverse axis and combinations and variations of these. By built along an axis it is meant that the horizontal (x direction) movement is of the stage is along that axis.

Figure 14A:
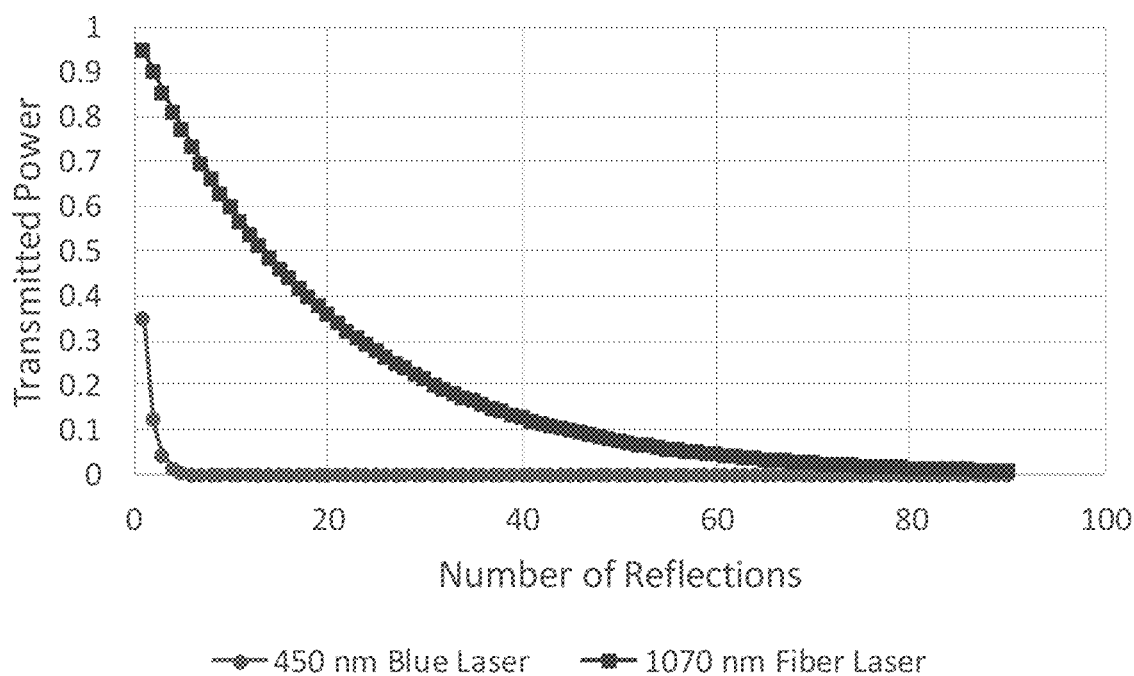
FIG. 14A is a graph showing an embodiment of blue laser light absorption compared to IR laser light absorption in a copper powder build material in accordance with the present inventions.

FIG. 14A illustrates blue light absorption in a powder bed is rapid with a very short mean free path which means that there is less light splash of high-power light outside of the spot or image when using blue compared to IR light.

Figure 14B:
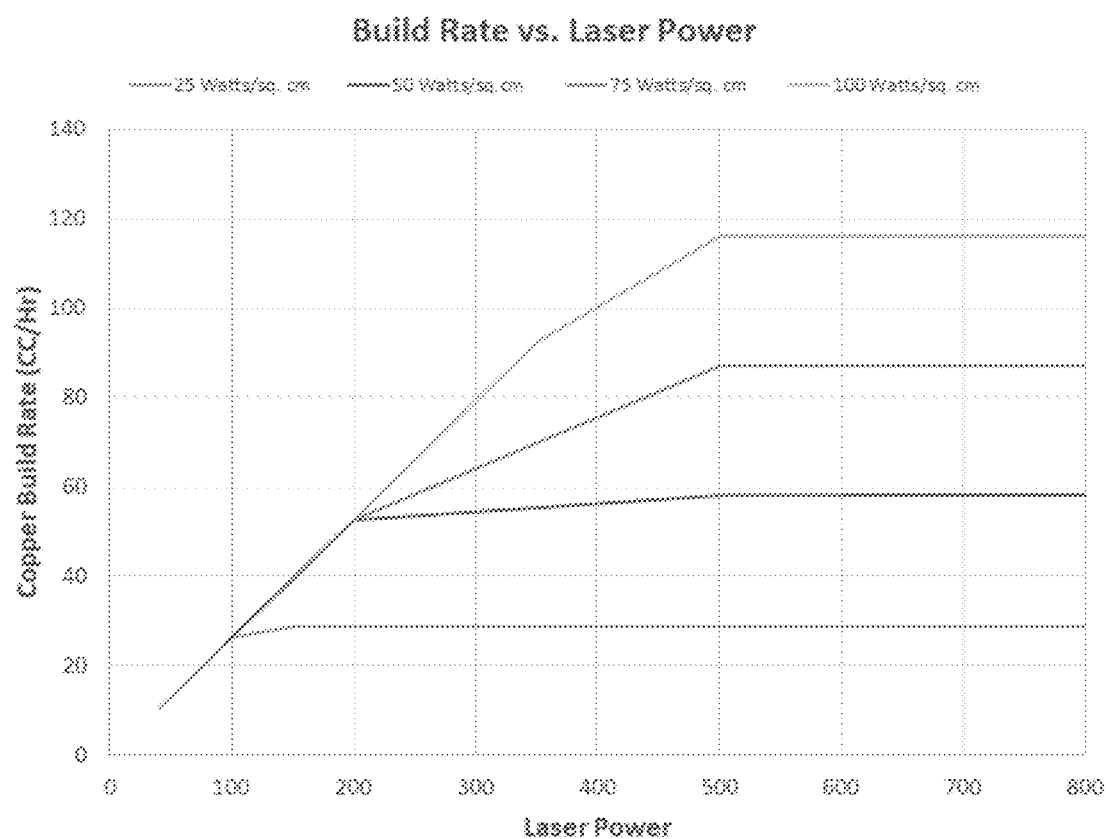
FIG. 14B is a graph showing an embodiment of blue laser light build rate compared to laser power in accordance with the present inventions.

FIG. 14B illustrates the build rate as a function of the average power density on the DMD and the laser power. For example, build rates in excess of 100 CC/hr can be accomplished with a peak laser power as low as 500 Watts. The mean free path of the blue laser beam in a powder bed, e.g., a metal powder, is substantially less than IR light. In this manner the blue laser beam has less heat loss due to scatter and thus enable the of thinner powder layers. In this manner higher resolution can be achieved. In this manner higher build rates can be achieved.

Part Design

An image is generated and saved as Monochrome Bitmap or optionally gray scale for finer part detail or attenuation of the Laser. Black pixels represent a dense part and correspond to a Laser pulse seen at the powder surface in a corresponding location at least once.

One iteration slices a 3D model into a series of layers which are then saved as images.

Image Slicing

Image slicing is completed in two stages: path definition, and path sequencing. In path definition, the user works with the raw-part image on a layer by layer basis. The image is divided into smaller overlapping shapes, the simplest of which being a rectangle, representing the eventual tool path and corresponding patterns to be displayed on the DMD and printed. Parameters required for computing paths are selected here and include but are not limited to the following: Stage speed, DMD region to be used (height, width, offsets), Laser pulse duration, Laser pulse selection (ie duty cycle), frame repetition, stage ramp up and slow down requirements with associated timing, path length/width, overlap, timing, direction, and order of execution. Additional process parameters may be selected at this time, including but not limited to Laser power and Laser focus offset.

Image to part scaling is also set during path definition. The simplest method for path selection would be to start with an image scaled to DMD-space, though this scaling could take place elsewhere in the process. Once paths are specified, an instruction file is compiled to translate the part into real-world coordinates. The instruction file (G Code) includes all information needed to run a part, layer, or segment, directions on where to find images, how to convert them into frames, and information on how to display them in a manor synchronized with stage motion and pulsing of the Laser.

A path sequence is a series of frames and the instructions for displaying them. Frames are calculated based on the parameters mentioned above. Frames are offset based on the speed of the stage, DMD to powder surface demagnification, DMD mirror pitch, Laser pulse duration, and delays associated with displaying images. Frames can be repeated when printing coarse geometry or to save on computation times. The raw image file can be converted into frames at run-time or it can be broken down into several smaller steps. These steps can include saving each path to file as individual images, saving frames to file as images, and saving sequences to file as binary data.

Alternatively, a DMD can be oriented in such a manor as to utilize built-in sequencing capabilities, like image scrolling. In this instance, an entire path-sized image is loaded into memory and stepped through to display the appropriate part selection, synchronized with stage motion. Alternatively, image scrolling could be enabled for arbitrary scan directions at a low level in DMD or printer software. This could involve rotating or transforming images stored in memory before they are displayed on the DMD.

Alternatively, an entire layer or part is loaded in memory and accessed in a manor similar to that stated above.

An iteration would map stage coordinates to DMD and image coordinates. Stage motion over a part would be synchronized with corresponding images being displayed and printed.

Images can be transformed or otherwise processed at any time, including at run time, to influence Laser to powder interactions, leverage collected in-situ data, impart a bias on final build characteristics, or account for existing anomalies in the powder. Image manipulation could also be performed based on other knowledge on the part, environment, or process.

Program Execution/Process

The process environment variables are set prior to processing including but not limited to selection of powder, powder thickness, powder compaction, powder bed temperature, and process gas at surface of powder.

When processing a path sequence, the laser is triggered at pulse widths that fall within the display time of individual frames on the DMD. Laser pulse triggers are sent directly from the DMD to the Laser. Timing between displaying frames on the DMD and stage motion is coordinated such that the original image is accurately scaled to real world dimensions in the powder.

Laser pulsing and process timing is managed in order to avoid overheating of the DMD.

A base layer is constructed such that subsequent layer fusion is supported and that the base layer is readily separated from the substrate after build completion.

An embodiment of the present systems and methods can use any laser wavelengths, but the preferred embodiment is to use a pair of blue lasers to print and fuse the layers of the part in a parallel fashion using a spatial light modulator as the means of defining the pattern on the powder bed that is to be fused. The laser source and the laser beam in embodiments can have wavelengths in the blue wavelength range and preferably can be 450 nm, about 450 nm, 460 nm, about 460 nm and have bandwidths of about 10 pm, about 5 nm, about 10 nm and about 20 nm, and from about 2 nm to about 10 nm, as well as greater and smaller values. The laser source and the laser beam in embodiments can have wavelengths in the green wavelength range and, for example, can be 515 nm, about 515 nm, 532 nm, about 532, nm, 550 nm, about 550 nm and have bandwidths of about 10 pm, about 5 nm, about 10 nm and about 20 nm, and from about 2 nm to about 10 nm, as well as greater and smaller values. Combinations and variations of these various wavelengths can be use in a system.

The print engine for an embodiment of the present systems and methods is based on a Digital Micromirror Device (DMD) array, embodiments of which can be obtained from Texas Instruments (TI), which creates the 2-D energy pattern to be printed. All of the DMD products made by TI are candidates for this process, the DMD used to print a. By 2-D energy pattern it is meant the image that the laser beam, or laser beam pattern forms on the bed of powder to be fused. As discussed in this specification while this image is observed as a 2-D energy pattern, i.e., an image on the bed of powder, it will have depth, i.e., 3-D properties as the energy penetrates into the bed and fuses the material to lower layers of the build object. These print engines can be used with any of the laser additive manufacturing systems and methods provided in this specification, as well as others. A blue laser reflected off the DMD array which when reimaged can provide multi-Watt to multi-kWatt power densities in a 2-D energy pattern on the powder bed. A second blue laser can be added to preheat the powder bed in the exact spot where the 2-D energy pattern is imaged to reduce the energy required from the laser-spatial light modulator pair to fuse the patterned powder to the underlying layers. This print engine is mounted on a precision gantry system that allows the 2-D image to be stitched together to form a larger 2-D image which is a single layer of the part. The system preferably includes a powder spreader as part of the gantry system or separate from the gantry system and an elevator as part of the build volume. The build volume is preferably very low oxygen and more preferably oxygen free and can be filled with either an inert gas such as Argon, or a mixture of gases to promote the fusing process such as Argon-$CO_2$. The powder bed and chamber can be directly heated by electric heaters, radiant heaters, and combinations and variations of these and other types of heaters, to reduce the heat loss from the part during the manufacturing process. In an embodiment, the conduction mode welding process is the preferred method for fusing each layer together which eliminates the spatter normally encountered in the keyhole process which is the typical process for all additive manufacturing scanned laser systems, prior to the present embodiments taught and disclosed in this specification.

In general, a Digital Micromirror Device ("DMD"), is a device that uses very small mirrors that can be made of aluminum to reflect light to make an image. The DMD may also be referred to as DLP chip. Embodiments of these devices can be a couple of centimeters (cm), from about 1 cm to about 3 cm, from about 1 cm to about 2 cm, a centimeter or less, less than 0.5 cm, less than 0.2 cm, or smaller, for their cross sectional dimension, (e.g., side of square, diameter of a circle, or long side of a rectangle, these devices may also be other shapes). These DMDs can contain from about 100,000 to 4 million, at least about 100,000, at least about 500,000, at least about 1 million, about 2 million, or more, mirrors, with each mirror, measuring about 4 μm or less, about 7.56 μm or less, about 10.8 μm or less, about 10 μm or less, from about 4 μm to about 20 μm and combinations and variations of these and larger and smaller sizes. The mirrors can be laid out in a predetermined pattern, such as matrix, for example, like a photo mosaic, with each mirror representing one pixel.

In an embodiment the DMD includes: a CMOS DDR SRAM chip, which is a memory cell that will electrostatically cause the mirror to tilt to the on or off position, depending on its logic value (0 or 1); a heat sink; an optical window, which allows the laser to pass through while protecting the mirrors from dust and debris.

In embodiments the DMD has on its surface several hundred thousand microscopic mirrors, or more, arranged in typically a rectangular array which correspond to the pixels in the image to be formed and displayed. The mirrors can be individually rotated, e.g., ±10-12°, or more or less, to an on or off state. In the on state, the laser from the laser source, e.g., the build laser and build laser beam, is reflected into the lens making the pixel direct the build laser energy into the image on the powder bed. In the off state, the laser beam, e.g., the build laser, is directed elsewhere, e.g., to a beam dump, making the pixel not contribute to the image or the fusing of the powder. It being understood that in embodiments the pre-heat laser beam many also be directed to and reflected from a DMD device to form a pre-heat image on the powder in the bed.

In an embodiment, which could be theorized as being analogous to greyscales of picture, the mirror is toggled on and off very quickly, and the ratio of on time to off time determines the amount of fusion or bonding of the powder in the powder bed. This provides the capability to control laser power, and power density (e.g., $kW/cm^2$), of the laser beam on the powder bed, without changing the power of the output beam from the laser source. In some embodiments more than 500 different powers and power densities, more than 700 different powers and power densities, and more than 100,000 different powers and power densities can be obtained. An alternative method to achieve a grey scale affect is to pixelate the image, dropping out individual pixels that are small in size compared to the thermal diffusion length in the material being processed. This effectively reduces the average power delivered to the image. This grey scale, whether in time or in space can be used to manipulate the melt pool and force it into a preferred shape.

Embodiments of DMDs for use in the present systems, print heads and print engines, can be obtained from TI, these DMDs would include: DLP2010, DLP3000, DLP3010, DLP4500, DLP4710, DLP5500, DLP6500, DLP7000, DLP9000, DLP9000x, DLP9500, with digital controllers; DLPA2000, DLPA3000, DLPA3005, DLPC3430, DLPC3433, DLPC3435, DLPC3438, DLPC3439, DLPC3470, DLPC3478.

Figure 1:
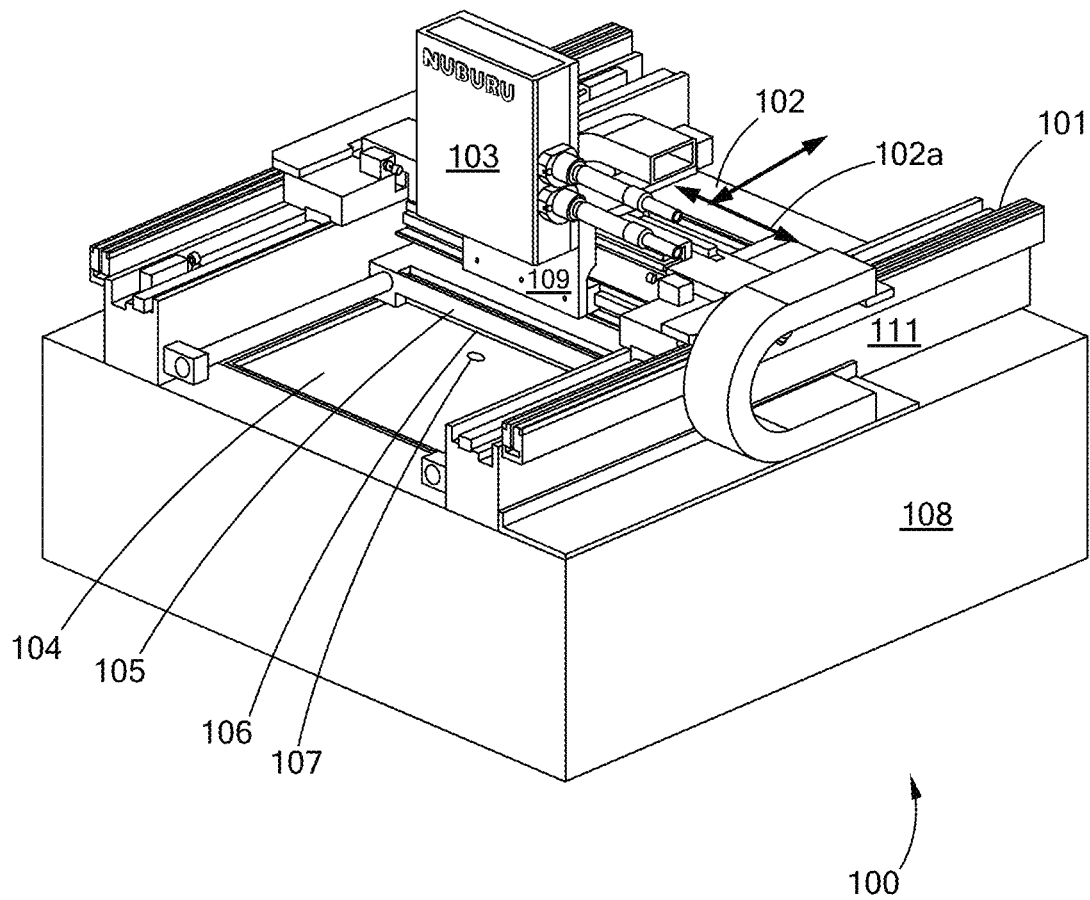
FIG. 1 is perspective view of an embodiment of an additive manufacturing system in accordance with the present inventions.

Turning to FIG. 1 there is shown an embodiment an additive manufacturing system 100. The system 100 has a base 108 that has a gantry system 101 mounted on the base 108. The gantry system 101 provides for movement of the DMD print head 103. This movement can be in the x-axis 102, or in the y-axis 102a. The system 100 has a powder bed elevator 104 (for moving the part down as it is built allowing the next layer to be deposited on the part), a powder bed spreader 105 and a powder roller 106. An image 107 from the DMD print head 103 is shown in the figure on the surface of the powder. The system has a laminar flow air knife 109 and a pyrometer or FLIR camera 110. The base 108 and the gantry system 101 have wiring harness 111, that can contain for example, gantry power, control lines and fiber optics for laser beam transmission. The laser source, or a part of it, in embodiments may be located on and move with the gantry. In embodiments the laser source is located away from the base, away from the laser head, or both, and is connected to, e.g., placed in optical communication with, the laser head 103 by optical fibers. The laser source may also be connected by a flying optic head design where the laser beam traverses free space to the print head.

Figure 2:
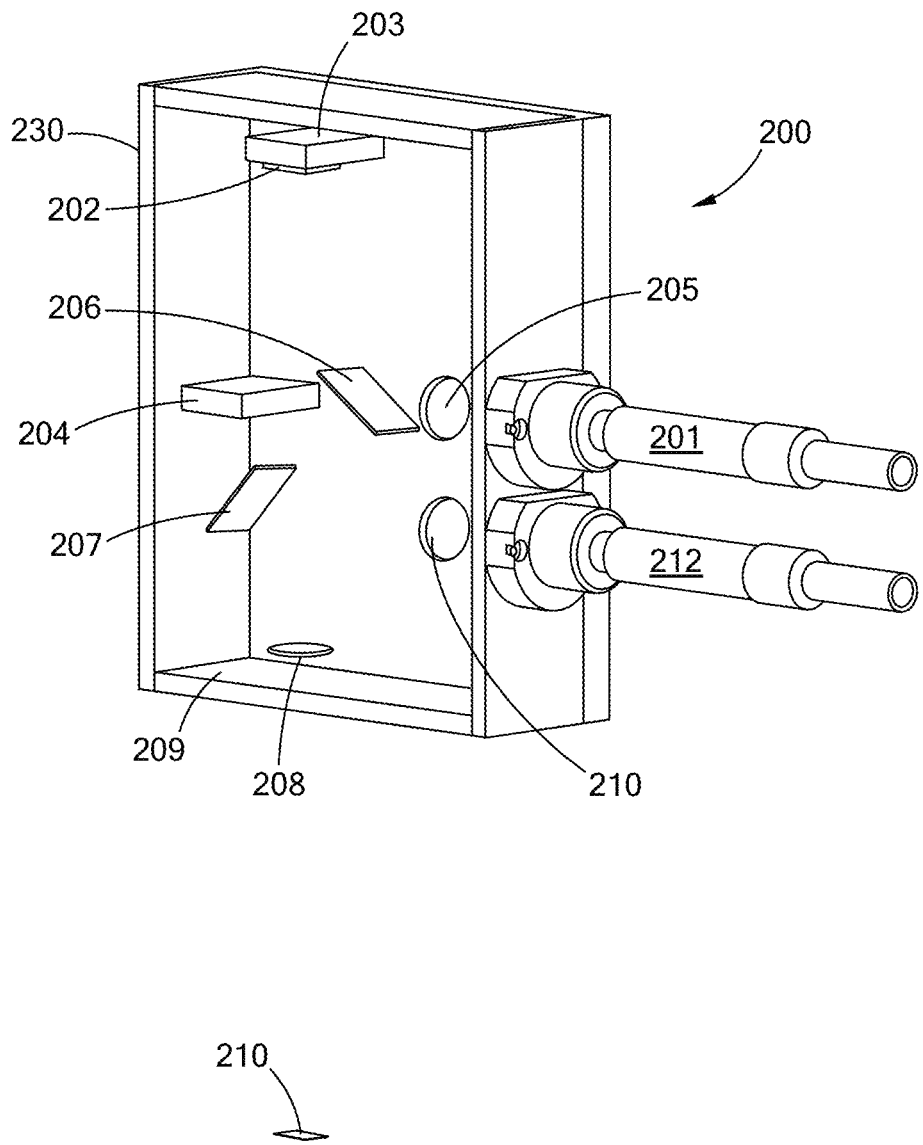
FIG. 2 is a cut away perspective view an embodiment of a laser DMD print head in accordance with the present inventions.

Turning to FIG. 2 there is shown a cut away perspective view of an embodiment of a laser DMD print head 200. This embodiment can be used with any of the systems of the present inventions, including the system of FIG. 1, as well as others. The laser DMD print head 200 has a housing 230, which contains the optical components, and has first laser input 201 and a second laser input 212, and an output or exit window 209. The laser beams travel into the housing 230 are directed and shaped by the optics and then exit the housing 230 through exit window 209 to form patterns (on the powder bed, which is not shown in this figure). In an embodiment these laser inputs 201, 212 are connectors and fibers for transmitting the laser beam from the laser source, such as QBH fiber optic cables that are in optical communication, e.g., connected to, the laser source to transmit the laser beams to the print head. The optics within the house 230 define two laser beam paths, one for each input. Along the first laser beam path, in the direction of the laser beam propagation, are input 201, a collimating lens 205, a turning mirror 206, DMD 202 (which is cooled by cooler 203), an off state beam dump 204 (which may also have cooling), and DMD imaging lens 208, from which the laser beam travels through window 209 to form image 210. Along the second laser beam path, in the direction of the laser beam propagation, are input 212, a collimating lens 210, turning mirror 207, (imaging lens 208, may or may not be in the second beam path and a second or separate imaging lens may be employed), and then through the window 209 to a location on the powder bed.

In an embodiment, of the additive manufacturing systems, the first laser beam path is the build laser beam and the build laser beam path, as it is the laser beam that fuses the powder to build an object. The build laser beam can have a wavelength in the blue wavelength range and preferably 440 nm, about 440 nm, 450 nm, and about 450 nm, 460 nm and about 460 nm, in the green wavelength range and, for example, can be 515 nm, about 515 nm, 532 nm, about 532 nm. The build laser beam can have any of the powers, power densities, peak powers and repetition rates set forth in this specification. The second laser beam path and the second laser beam which travels along that path, is a pre-heat laser beam. It does not need to be the same wavelength, and can be anything from 440 nm to 1,100 microns, or it can be the same wavelength as the build laser, it has a lower, similar or higher power density on the powder bed and is used to pre-heat the powder bed, as well as maintain the temperature of the powder bed, to facilitate the build laser's ability to fuse the powder to build an object.

In an embodiment of printer head 230, the second laser input 212 is connected to a laser source for pre-heating the bed of powder. In this manner, the second laser beam path, and its associate optics are for a pre-heating system. Thus, in this embodiment the first beam path and components from connector 201 through window 209 to image 210, as described above, provides a laser beam for fusing the powder bed material together, i.e., a build laser beam, or fusing laser beam; and the second beam path is for providing a pre-heating laser beam.

An embodiment of the present systems and methods can use any laser wavelength, but the preferred embodiment is to use a pair of blue lasers to print and fuse the layers of the part in a parallel fashion using an array of spatial light modulators combined with an array of lasers as a means to define a 2-D energy pattern on the powder bed to be fused. The energy pattern may be contiguous or separate, when separate portions of the part or separate parts are processed in parallel. By combining multiple energy patterning systems together, a higher total power can be delivered to the surface of the powder bed and as a result a larger part can be printed with a single pulse resulting in a substantial improvement in the build rate for the machine. Multiple DMDs are used because of the limitation on the power handling capability of the DMD. An off the shelf DMD system is capable of handling from 25 W/cm$^2$ up to 75 W/cm$^2$ of blue laser light on a continuous basis depending on the backplane temperature and cooling method. The larger the part to be produced, the greater the amount of total power required to completely melt the 2-D pattern across the surface. Since the DMD in embodiments can be the limiting factor for the power delivered, multiple DMDs in parallel can be used to provide the area scaling necessary to achieve the high build rates desired. Furthermore, this print engine can be mounted on a precision gantry system that allows the 2-D image to be stitched together to form a larger 2-D image which is a single layer of the part. Embodiments of the system can include a powder spreader as part of the gantry system or separate from the gantry, and an elevator as part of the build volume. The build volume should have reduced oxygen, and preferably is oxygen free and can be filled, for example, with either an inert gas such as Argon, or a mixture of gases to promote the fusing process such as Argon-$CO_2$. The energy patterned areas can be pre-heated by a secondary laser source or directly heated by electric heaters and radiant heaters to reduce the heat loss from the part during the manufacturing process. The secondary laser or secondary heat source raises the base temperature of the powder bed and reduces the energy requirements for melting the powder by the laser/spatial modulator system, i.e., the fusing or build laser beam or sub-system of the additive manufacturing system. In embodiments, the conduction mode welding process is the preferred method for fusing each layer together which eliminates the spatter normally encountered in the keyhole process which is the baseline process for all additive manufacturing scanned laser systems.

2-D Energy Patterning System (for 3-D Build)

Figure 3:
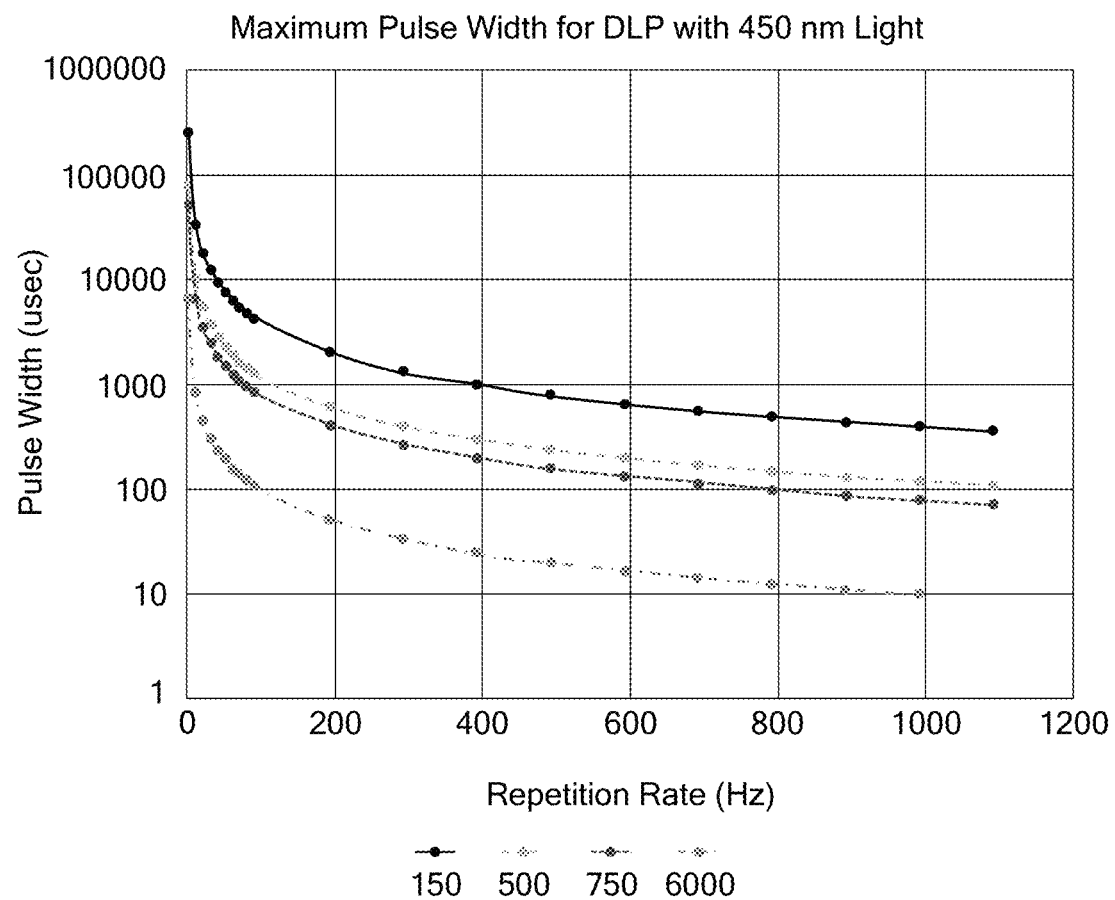
FIG. 3 is chart comparing pulse width to repetition rate for embodiments of a given power in accordance with the present inventions.

A preferred embodiment for this system is a Digital Micromirror Device (DMD) from TI. This array consists of micromirrors that tilt when commanded to turn-off or turn-on the transmitted light. Grey scale is accomplished by modulating the position of the mirrors or the power setting of the laser at a high speed during the process to set the amount of energy to be delivered to the surface or by randomly turning mirrors to the off state throughout the image to reduce the average power density in the image. A preferred DMD arrays is one that has been optimized for use with the wavelength of the laser beam, e.g., optimized for wavelengths in the blue wavelength range and preferably 400 nm, about 440 nm, 450 nm, and about 450 nm, 460 nm and about 460 nm optimized for wavelengths in the green wavelength range and, for example, can be 515 nm, about 515 nm, 532 nm, about 532 nm and in the red wavelength range of 600 nm to 700 nm. Typical DMDs for light in the visible wavelengths have a reflectivity of 88% at 450 nm and a diffraction efficiency in excess of 64%. This high transmissivity enables these devices to handle an average power density of 25 W/cm$^2$ or greater depending on the cooling method, and to handle build laser beams in the blue, green and red wavelengths, (visible light). Tests conducted on the DMD with a micro-channel cooler have shown that it is safe to operate the device at power densities of up to 75 W/cm$^2$. DMDs can have operating power densities, e.g., average power density rating, of from about 25 W/cm$^2$ to 160 W/cm$^2$, about 50 W/cm$^2$ to 100 W/cm$^2$, and about 25 W/cm$^2$ to 75 W/cm$^2$, as well as greater and smaller values. The average power density rating is the continuous heat load rating for this device. Because of the high reflectivity, short pulses at low repetition rates can have a substantially higher power density than the continuous power rating of the device. Turning to FIG. 3 there is shown a chart providing the calculation of the maximum pulse width for a given repetition rate to maintain this average power density. The calculation is performed for laser power levels ranging from 150 W (Watts) to 6 kW (kiloWatts). At 6 kW, the instantaneous power density, or peak power, on the DMD device is 2.5 kW/cm$^2$ for a DLP9500 device, a factor of 1,000 greater than the average power density rating of the device. This level of power throughput can be achieved because the laser pulse width is short, and the duty cycle is low resulting in the average power on the device not exceeding maximum ratings. Optical coatings, in this case, enhanced aluminum, are capable of sustaining very high peak power levels as long as the energy absorbed does not exceed the damage threshold of the coating or mirror. The damage level of an aluminum optical coating in the pulsed mode is typically 10-50 MW/cm$^2$ for short pulses, this application in the present systems is well below this damage limit. In addition, the thermal mass of the mirror serves to absorb the 12% of incident energy and determines the maximum exposure time for a given power density to maintain the temperature of the mirror to within the recommended operating range. Consequently, the present DMD systems and methods can deliver peak intensities to the powder bed that are capable of directly fusing metal powders, without damaging the DMDs.

Thus, in embodiments of the present system the DMD devices in additive manufacturing systems and methods are subject to, and reflect and direct laser beams to form an image on the powder bed, where the laser beams have a peak power density (kW/cm$^2$) on the powder bed that is 2×, 10×, 100×, 1,500×, from 100× to 1,000× and greater, than the average rated power density for the DMD.

Figure 4A:
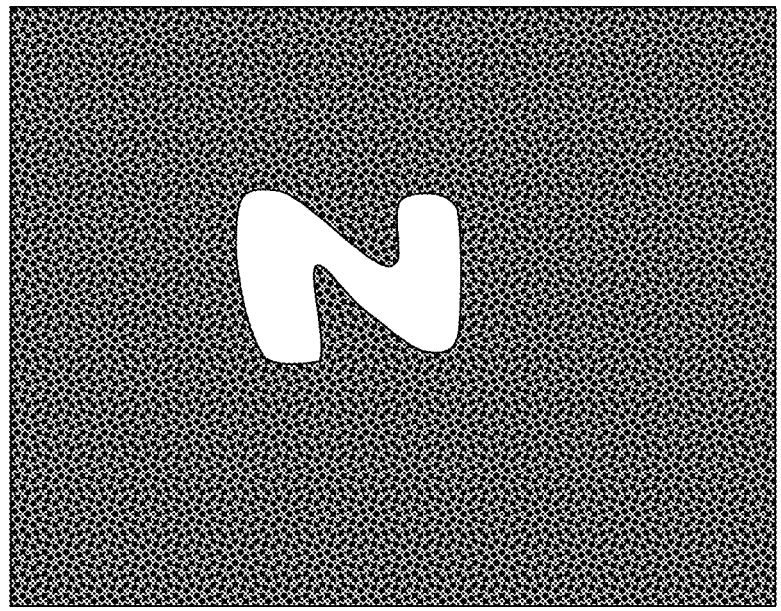
FIGS. 4A and 4B are photographs of printed patterns using an embodiment of a laser spatial light modulator in accordance with the present inventions.
Figure 4B:
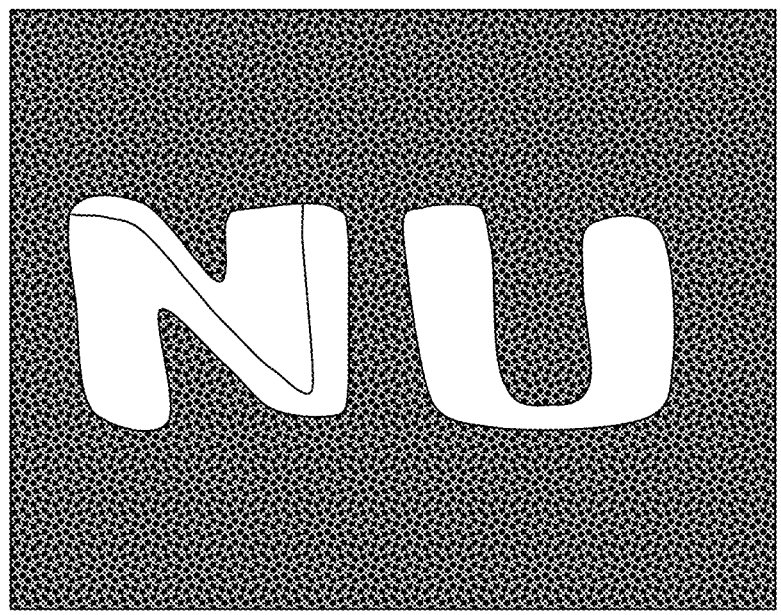

Turning to FIGS. 4A and 4B, there are shown photographs of printed patterns. In FIG. 4A there is shown a directly fused metal powder, in this case it is a copper powder layer that is 100 μm thick, and the image of the "N" is directly printed by the laser/spatial modulator system. The melting point of the copper powder is 1085° C. FIG. 4B shows a second letter "U" directly printed by the laser/spatial modulator system. The powder was pre-placed by hand and heated to 100° C. to drive off impurities before processing. The printing process begins by downloading an image of the letter N to the DMD. The blue laser system is then pulsed on for 4 mseconds at a duty cycle that maintains the 25 W/cm$^2$ recommended operating point and delivers 85 Watts peak power on the surface of the powder bed which corresponds to a power density of 3.7 kW/cm$^2$. Since a low power laser was used for this test, the image on the DMD was scrolled in such a way that the image on the moving gantry system was stationary until sufficient energy was deposited to heat the powder and fuse it into an image. The image was then changed to the next letter and the process repeated. The powder bed was at 20° C., so all the energy for heating and melting the powder came from the laser/spatial light modulator system. The letters are approximately 500 μm high and 500 μm wide. With higher laser powers and a heated bed, it is feasible to melt the powder with a single pulse.

In an embodiment, a 6 kW blue laser source (a build laser beam) is operated with a pulse width of 6.5 mseconds and a repetition rate of 3 Hz, this corresponds to a build rate in excess of 75 cc/hr when using copper powder. A homogenizer is used to evenly distribute the laser energy across the DMD. The power density on the DMD is 2.5 kW/cm$^2$ which is 2 cm wide by 1.1 cm high. The DMD has a resolution of 1,920 mirrors by 1,080 mirrors on a 10.8 μm pitch. The reflectivity of the DMD mirrors at this wavelength is approximately 88%, the transmissivity of the device's window is 97%, the diffraction efficiency of the DMD is ~62% at this wavelength and the transmissivity of the imaging optic is assumed to be 99%. Using a 2:1 imaging optic, a 10 mm×5.5 mm image is relayed to the powder bed and the estimated losses results in ~6 kW/cm$^2$ power density on the powder bed from the laser-spatial light modulator combination which is a factor of 1.6× above the intensity used in the test in FIGS. 4A and 4B, and the total energy deposited is greater by a factor of 60×. The "system" image resolution is approximately 5.04 μm, giving the system higher resolution than any other laser sintering approach. Since the published average power density of the DMD chip is limited to 25 W/cm$^2$, a pulse width of 6.5 msec was chosen for the 6 kW laser source which corresponds to approximately 21 Joules of energy being deposited in the powder bed. In the experiment shown in FIGS. 4A and 4B, significantly lower energy deposition (0.34 Joules) was required because the illuminated region was only 0.5 mm×0.5 mm. Assuming a bed temperature of 600° C., it is estimated that it takes 14 Joules of energy to melt a volume of copper powder that is 10 mm×5.5 mm×0.1 mm with a 25% void content. This analysis does not consider any heating of the substrate, which can drive the energy requirements higher. The highest energy requirement occurs when printing the first layer of the part, there the diffusion of thermal energy into the substrate can increase the energy requirements by a factor of 3 to melt and fuse the powder. The secondary heating laser can be used to supplement the imaging system to deliver the extra energy required at this step. As the build progresses, the thermal diffusion is now a factor of the mass in the preceding layer, the thinner the part, the lower the power requirement, the greater the dimension of the preceding layer, the greater the power requirement, with the highest power requirement occurring during bonding of the first layer to the build plate.

By resolution of the system or method, it is meant that objects built by the system can have their smallest part, or smallest dimension, equal to the stated resolution, e.g., the resolution defines the smallest dimension of an object that can be built. Thus, by resolution of the laser systems, resolution of the method, it is meant that the system and method have the ability to build a part, or have features in that part, that are at the resolution. Thus, by way of example a 75 μm resolution would provide the ability to build parts having their smallest dimension at 75 μm, having their smallest feature at 75 μm, or both. Embodiments of the blue laser 3-D additive manufacturing systems, e.g., 3-D blue laser printers, and embodiments of the blue laser 3-D additive manufacturing methods have resolutions from about 0.5 μm to about 200 μm, and larger, about 0.5 μm to about 100 μm, about 0.5 μm to about 50 μm, less than about 100 μm, less than about 75 μm, less than about 50 μm, less than about 25 μm, less than about 10 μm, and less than about 5 μm. The systems can have both the capability for large resolution, e.g., greater than 200 μm, and very fine resolution of about 0.5 μm to about 10 μm, and 1 μm to about 5 μm. Further, embodiments of the present systems and methods, including the embodiments and examples in the specification, as well as those embodiments having, wavelengths of blue, 440 nm, about 440 nm, 460 nm, green, 515 nm, about 515 nm, 532 nm, about 532 nm, 550 nm, about 550 nm, have resolutions from about 10 μm to about 0.5 μm, less than 10 μm. less than 5 μm, less than 2 μm, from about 3 μm to about 0.9 μm, about 1 μm, and smaller values, as well as the other values in this paragraph.

Figure 5:
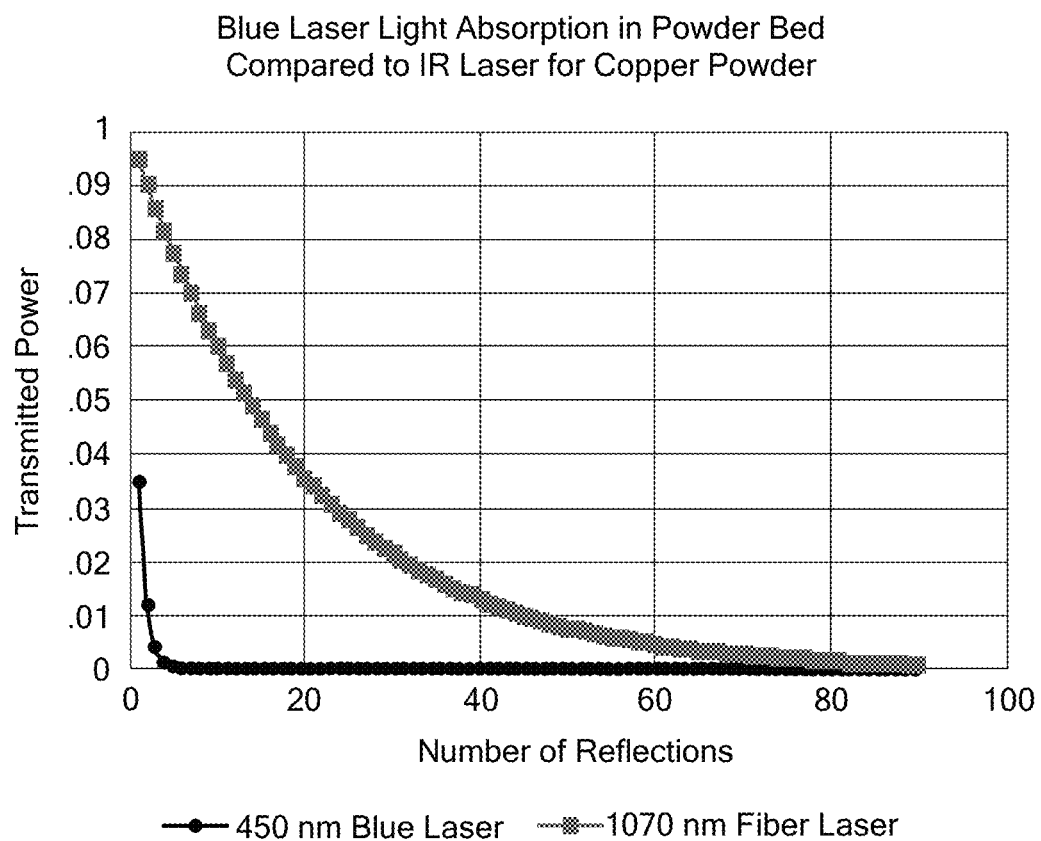
FIG. 5 is chart comparing blue light absorption in powder bed for embodiments of systems in accordance with the present inventions, in comparison to IR laser systems.

FIG. 5 is a comparison of how rapidly the blue laser light is absorbed in a copper powder bed compared to an IR laser. The high absorption rate of the blue laser light is a factor for making this process obtain the desired resolutions, build speeds and both, since the IR laser would be scattered into the powder bed outside of the pattern to be fused and much higher power level lasers would be necessary and the resolution is limited in the IR by the high scattering factor. Therefore, the assumption that 100% of the light is absorbed can be used. If the powder layer is 75% dense, then the energy required to heat the powder layer to 1085° C. from 600° C., which is the melting point of copper, can be calculated based on the heat capacity equation. Since a phase transition is involved, the heat of fusion is included in the energy requirement calculation. Based on the sum of the two components, the energy required to melt a 10 mm×5.5 mm×100 μm volume of copper is approximately 14 Joules. Based on this calculation, typical DMD arrays available today are suitable for use in a metal based additive manufacturing system, preferably if the base temperature of the powder is adjusted to compensate for the energy required to melt the metal or a secondary laser is used to pre-heat the image area.

An embodiment using a 500 Watt blue laser source to heat the copper powder bed through the DMD, can provide a pulse wide of up to 78 msec when pulsed at a 1.5 Hz repetition rate. Under these conditions, the 500 Watt blue laser source would deliver 39 Joules to the copper powder bed which is sufficient energy to go from a 400° C. background bed temperature to melting the copper.

In some embodiments, while the laser-spatial light modulator combination is capable of providing sufficient energy to melt the 50 μm thick powder layer, it may not be sufficient energy to fuse to the layers below. Since a conduction mode weld proceeds through the layers of material in a spherical fashion, the weld is as wide as it is deep. For example, a 50 μm deep weld bead would be at least 50 μm wide. To make certain that the powder layer is fused to the layer beneath it, then the minimum feature size will have to be at least 1.5-2× the depth of the powder layer. This means that a 75-100 μm wide bead is used to fuse the powder layer to the lower layer. Taking the energy required to fuse to the lower solid layers into consideration increases the energy required to melt and fuse the powder from 36 Joules to 86 Joules when going from 400° C. to the melting point of copper. In embodiments, this is not achievable with just the laser-spatial filter combination, so either the bed temperature is raised or a separate source of heat is added. By adding a second laser, preferably without a spatial light modulator, the additional heat is added to raise the temperature of the powder, without melting it. Thus, this second laser, can pre-heat the powder and maintain the temperature of the powder layer and the build object above ambient temperature, for example the powder can be pre-heated to and maintained at temperature of greater than 100° C., greater than 200° C., greater than 300° C., greater than 400° C., from about 300° C. to about 600° C., within 300° C. of the melting point of the powder, within 200° C. of the melting point of the powder, within 100° C. of the melting point of the powder, up to and just below the melting temperature of the powder, and high and lower temperatures.

As used herein, unless expressly stated otherwise, spatial light modulator, laser/spatial light modulator, DMD systems, laser-spatial, and similar such terms, refer to the same general type of system, or subsystem, using micromirrors, micro-reflective assemblies, or similar reflective components having micro level or sub-micro level resolutions, to create the laser pattern and images for the build laser beam on the powder bed as well as liquid crystal and other types of crystal based spatial light modulators.

Figure 6:
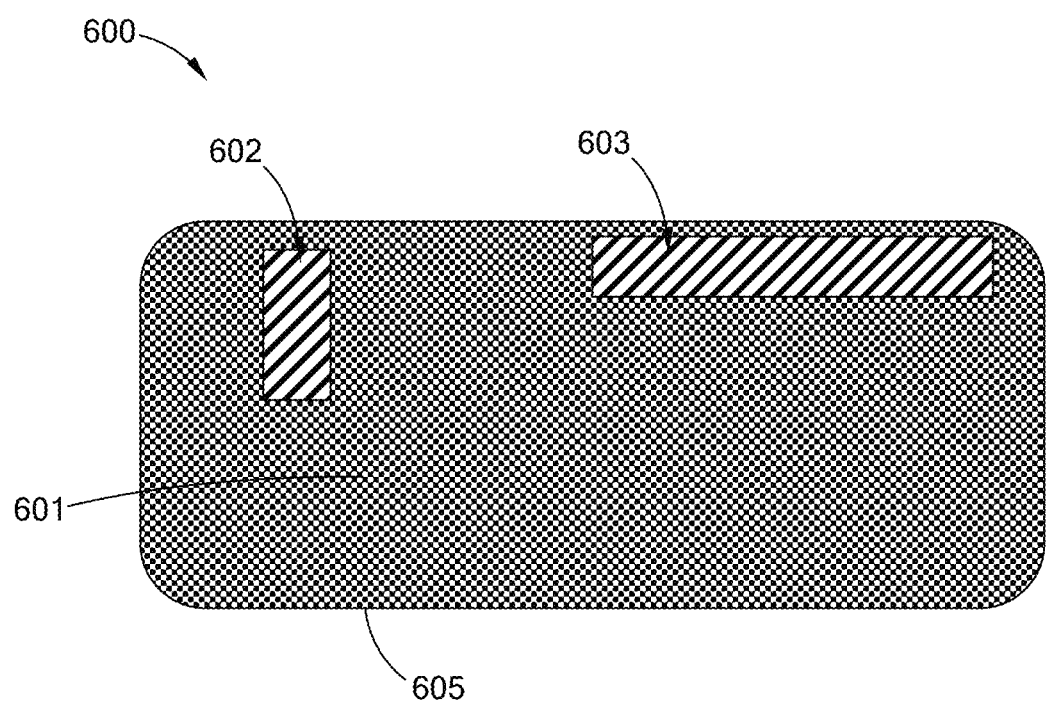
FIG. 6 is a schematic view of an embodiment of an overlap pre-heat beam and build laser beam in accordance with the present inventions.
Figure 7:
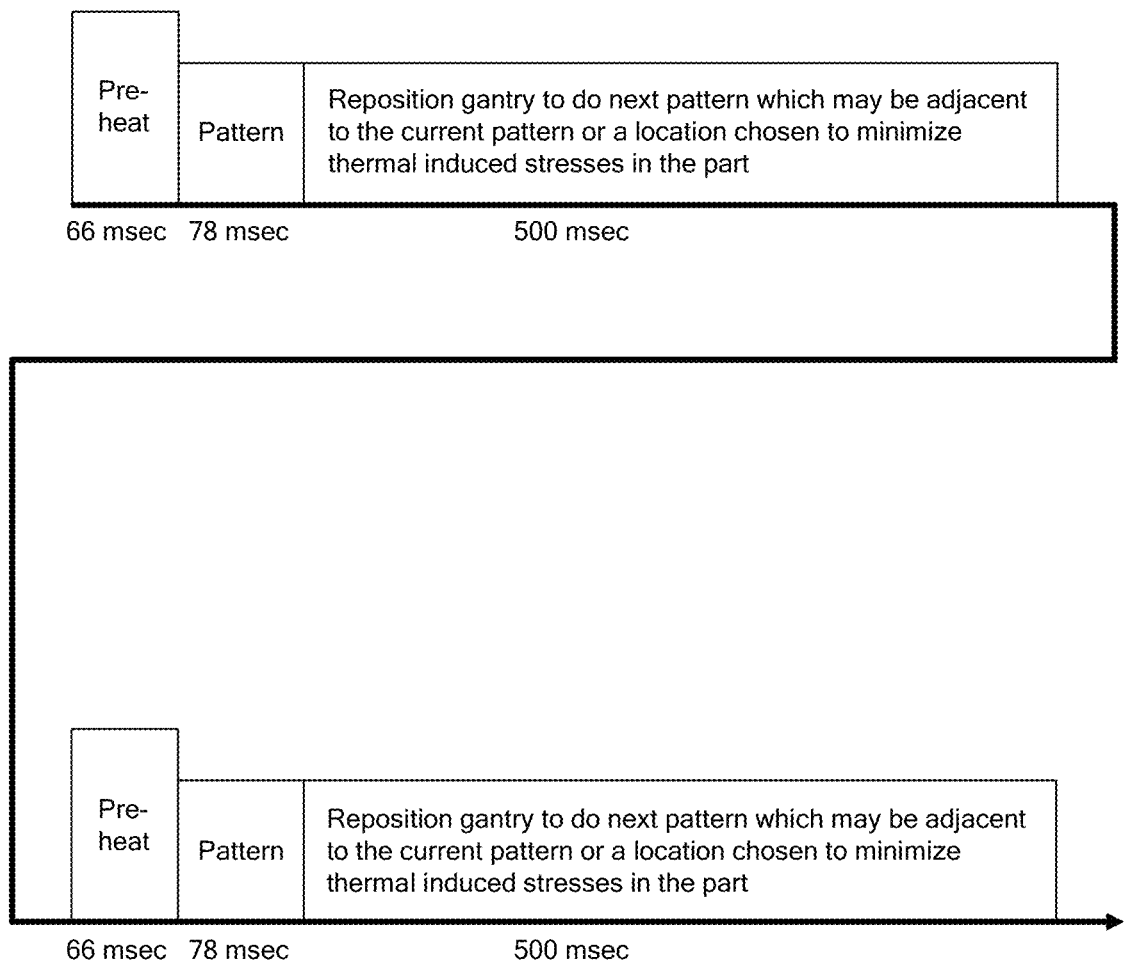
FIG. 7 is a flow diagram of an embodiment of the timing for a system and method in accordance with the present inventions.

The second laser (e.g., second beam path of FIG. 2, as discussed above) illuminates the same area as the laser-spatial light modulator does as shown in FIG. 6. In FIG. 6 there is a bed of metal powder 600. The pre-heat laser beam forms a pre-heat laser pattern 601 that heats an area 605 of the bed 600. There is also shown build laser patters 602 and 603 on the bed of metal powder 600. Thus, the material in area 605 is heated by the second laser beam, e.g., the pre-heat laser beam, and the heated material in laser patterns 602 and 603 is fused into an object. For the case discussed above, 86 Joules of heating is required to melt and fuse the powder. If the 500 Watt laser-spatial filter combination provides 39 Joules to the pattern, then the second laser provides the balance or 47 Joules. To accommodate the time to move, coat and perform other functions, the pulse width of the pre-heat laser can be 10% of the duty cycle or 66 msec. This corresponds to a pre-heat laser power of 750 Watts. Assuming the second laser heats the powder bed region to within 200° C. of the melt point, then when the laser-spatial light modulator illuminates the part, it raises the temperature of the patterned area on the powder bed and the lower layers to the melting point of the copper. FIG. 7 illustrates the timing for the system. This sequence results in the melt and complete fusion of the 50 μm powder layer to the fully dense layer below it.

In an embodiment, the laser-spatial light modulator pair is based on a 6,000 Watt blue laser operating at a repetition rate of 1.5 Hz. The pre-heat laser is a 750 Watt laser. The pre-heat laser operates for the same duration as mentioned above (66 msec) to increase the powder bed temperature to within 200° C. of the melt temperature of the material to be melted (e.g. the powder in the powder bed), in this case copper. A pyrometer or FLIR camera is used to monitor the temperature of the powder bed during this pre-heat process and controls the laser power to maintain that temperature until the laser-spatial light modulator image illuminates the powder bed region and fuses the powder to the lower layer. The 6,000 Watt laser is on for 6.5 msec, while the 750 Watt laser may be on for 66 msec or longer. In this embodiment, the chamber temperature is assumed to be at or near room temperature.

In an embodiment, the laser-spatial light modulator pair is based on a 500 Watt blue laser operating at a maximum repetition rate of 1.5 Hz. The pre-heat is a 1,000 Watt laser. The pre-heat laser operates for the same duration as the case above, about 78 msecs. However, the pre-heat laser with the higher power level now operates for only 25 msecs, giving additional time to reposition the pattern. In this embodiment, the chamber is assumed to be at or near room temperature.

The laser printing engine described is mounted on a precision gantry system, such as the embodiment of FIG. 1, in an air-tight enclosure. The air-tight enclosure if filled with an inert gas, which is continuously circulated to clear out any welding fumes as the process proceeds. The inert gas environment ensures there is no surface oxidation during the build which can lead to porosity in the part. The gantry system allows the head to be positioned in the x-y direction, while an elevator is used to move the part down as each new layer is printed. In principle, this approach to step and repeat of the 2-D energy pattern can be applied to any large volume, e.g., 0.5 m³, 1 m³, 2 m³, 3 m³, 10 m³, from 1 m³, to 10 m³, and larger and smaller volumes, with the constraint being the accuracy of the gantry system employed.

Figure 8:
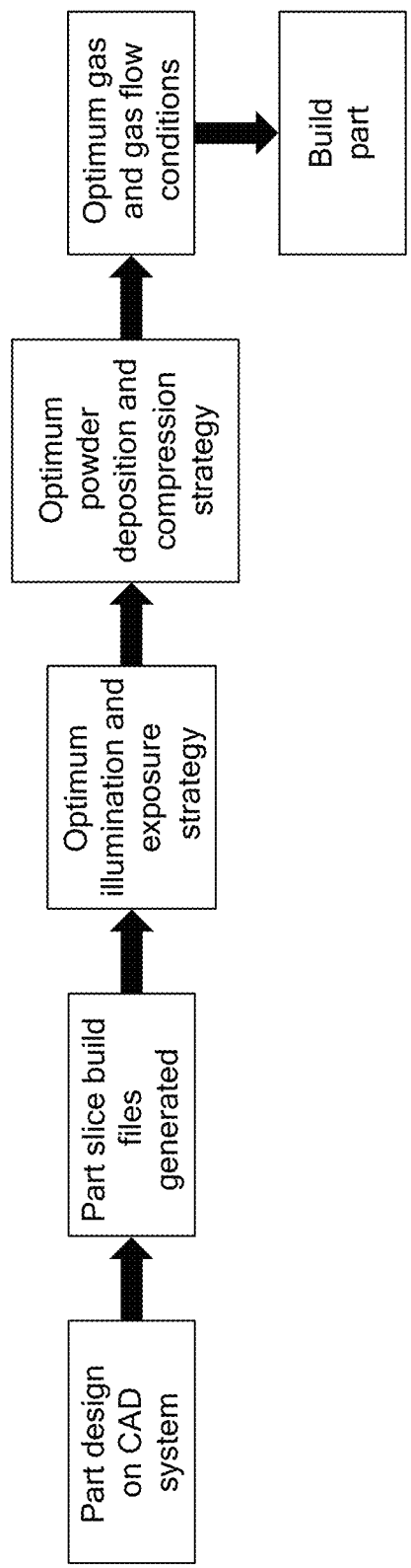
FIG. 8 is a flow diagram of an embodiment of the timing for a system and method in accordance with the present inventions.

The build begins with a Computer Assisted Design file, typically a step file. Software first divides the object into 50 μm slices, less or greater depending on resolution and shape. The surface revealed after the slicing is then divided up into sections that are the same image size as the spatial light modulator. The build strategy is then decided by the software as to which portion of the pattern to expose first, what the exposure levels should be and what support structure if any should be used. The software also determines the optimum on-time for the pre-heat laser as well as the laser-spatial modulator system. The pre-heat time may vary depending on the density of the base material, the melt temperature of the base material, the amount of material in the layer below the layer to be fused and the density of the material in the layer below the layer to be fused. Based on the size of the part, the part complexity and the orientation of the part, radiant heaters may be used to keep the bed, walls or ceiling of the build chamber at an optimum temperature to prevent heat loss at the wrong rate to the build environment. This processing sequence is outlined in FIG. 8.

The following examples are provided to illustrate various embodiments of the present laser systems and components of the present inventions. These examples are for illustrative purposes, may be prophetic, and should not be viewed as limiting, and do not otherwise limit the scope of the present inventions.

Example 1

An embodiment of an additive manufacturing system as generally shown in FIG. 1. The system 100 consists of an x-y Gantry System 101 mounted on a vibration isolation platform. The x-axis of the gantry system 102 consists of a pair of air bearings and a linear motor capable of positioning to an absolution position of 1 micron or less. The motor for the x-axis of the gantry system can also move the Powder Spreader 105 in a bi-direction fashion to spread the powder. The powder can be delivered either by a second elevator section filled with powder or a powder hopper that drops the powder onto the powder bed. The powder hoppers are not shown in this figure but would be mounted at the front and back of the gantry system. The entire system will be enclosed in an air-tight enclosure which is also not shown in this figure. The DMD laser print head 103 is mounted on the y-axis of the gantry system and can traverse the bed and be positioned to within a micron of any position along the axis repeatably. The powder bed 104 is on a high precision elevator that enables the bed to be lowered a minimum of 10 µm after each process step. This allows the powder spreader 105 to place a uniform layer of powder over the previously fused image. A roller 106 which rotates in the opposite direction of the motion is used to smooth and compress the powder layer. The powder bed has built in heaters to enable elevated temperatures to be used in the build cycle. A laminar flow air knife is placed directly below the DMD laser print head 109 to prevent debris or smoke from reaching the window that the DMD image and secondary pre-heat laser emerge from. The DMD image 107 is positioned on the powder bed according to the slicing software and the pattern is varied as the image is stepped over the width of the image to complete the adjacent portion of the part. The image may also be stepped further away depending on the management of the heat buildup in the part and the desire to minimize warpage and stress in the part.

Example 2

An embodiment of the DMD print head as generally shown in FIG. 2. The main laser power to be modulated is delivered to the print head 200 through an industry standard QBH fiber cable 201. The second laser that will be used for pre-heating is also delivered through an industry standard QBH fiber cable 212. These cables are designed to be robust and provide a seal to the external environment during operation. The cables both 400 µm or smaller diameter fibers inside of a protective sheath. A pair of 40 mm collimating lens 205, 210 are used to collimate the output of each of the optical fibers. Depending on the shape and the uniformity of the beam from the optical fiber, a homogenizer and beam shaping optic would be inserted just after the collimating optic. Both the primary laser source (build laser) and the secondary laser source (pre-heat laser) may use the homogenizer to provide a uniform enough intensity that the fused print is uniform. A turning mirror 206 is used to direct the collimated beam from the main laser's optical fiber 201 onto the DMD at the requisite angle of 24 degrees from the surface normal of the DMD. When the laser is in the on state, the DMD 202 mirrors are tilted toward the incoming beam and redirect the beam normal to the DMD surface. When the laser is in the off state, the DMD 202 mirrors are tilted away from the incoming beam and redirect the incoming beam 48 degrees away from the incoming beam from the vector normal to the DMD surface. This is where the beam dump 204 is located because it has to intercept any beam energy that will be in an off state in the image. The beam from the DMD 202 is now reimaged with a 100 mm FL lens to a spot 200 mm below the laser printing head. This is a 1:1 imaging arrangement, other ratios may be employed depending on the size and accuracy of the part required. The secondary laser's optical fiber output 212 is collimated by the lens 205 and may go through a beam homogenizer to achieve the desired uniformity of fusing. After the beam conditioning of the secondary beam, it is directed or reimaged onto the same spot as the DMD image using mirror 207. This system does not go through the same imaging lens as the DMD beam. The two beams, both the DMD beam and the secondary beam do however exit the print head through a common window 209. However, a second window can be used to allow the pre-heat laser to exit depending on the geometry of the system. The net result is the overlapped DMD image 210 with the secondary laser beam on the powder bead as depicted in FIG. 6.

Example 3

An embodiment of the present invention relates to using multiple DMD within the same imaging aperture or parallel imaging apertures. Turing to FIG. 9 there is shown a schematic of a multi-DMD laser printing system 200. The system has two laser build subsystems 941, 942. Subsystem 941 has a laser source 901, a collimator/homogenizer 903, a DMD 905, a mirror 905a, a 2:1 image size reduction optical assembly having lens 907 and lens 909, a mirror 911, and imaging lens 920, which are located along laser beam path 913. In this manner the laser beam for fusing the powder, e.g., the build laser beam, travels along laser beam path 913 through these various components and provides an image as image tile 950a. Is it seen that the image tiles 950a, 950b, 950c, 950d form a tiled image that can have a large number of tiles. Subsystem 942 has a laser source 902, a collimator/homogenizer 904, a DMD 906, a mirror 906a, a 2:1 image size reduction optical assembly having lens 908 and lens 910, a mirror 912, and imaging lens 920, which are located along laser beam path 914. In this manner the laser beam for fusing the powder, e.g., the build laser beam, travels along laser beam path 914 through these various components and provides an image as image tile 950b.

Two additional laser build subsystems of the same configuration as system 941, 942, would be used in this system, but are not shown in the drawing. These additional two systems would provide images for image tiles 950c, 950d. In this embodiment the tile images are preferably adjacent.

For additional laser build subsystems of the same configuration as system 941, 942, would be used in this system, but not shown in the drawing. These four additional systems would provide images for image tiles adjacent to 950a, 950b, 950c and 950d into the paper to create a 2-d tiled image.

This system can have lens configurations that provide either an inverting or non-inverting image.

Figure 9:
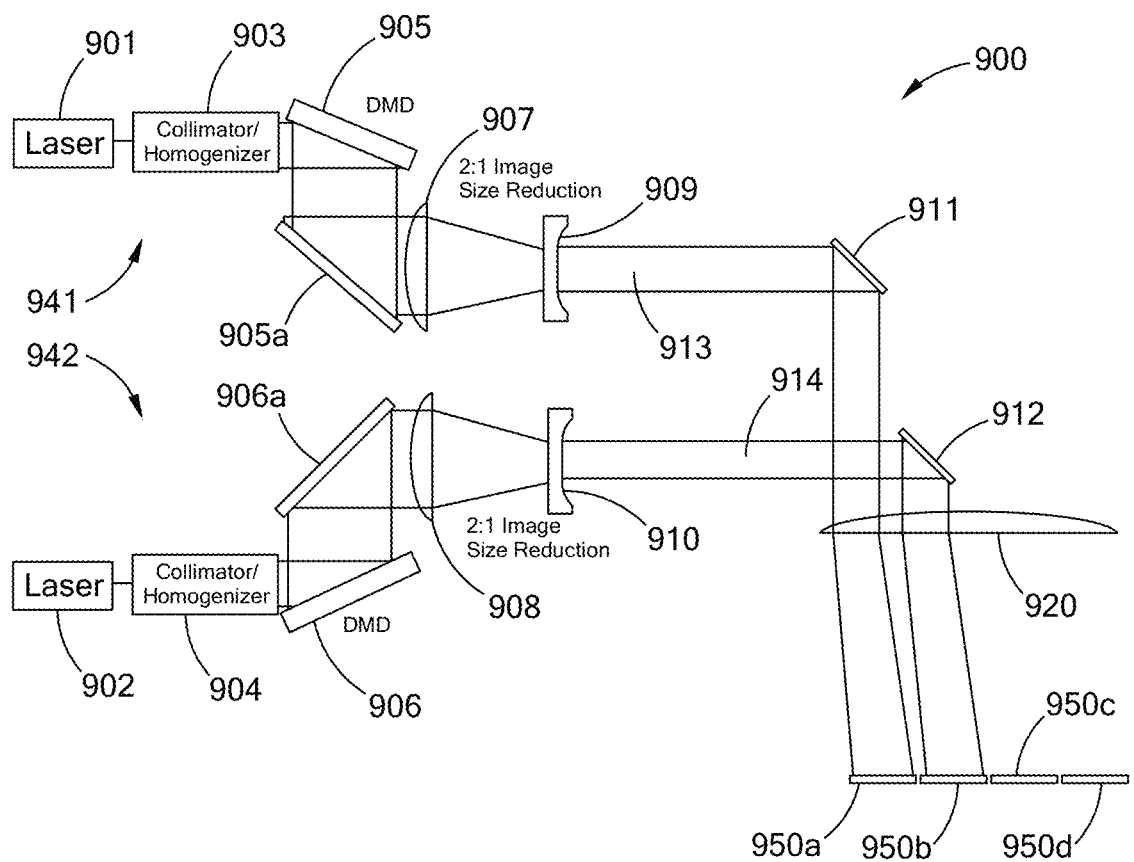
FIG. 9 is a schematic diagram of an embodiment of a multi-DMD laser printer system in accordance with the present inventions.

Each DMD has its own laser source and the image space of each DMD can be tiled used shearing mirrors to create a continuous image space over a much larger area than a single DMD system can achieve. There can be some dead space between each DMD image space which can be minimized with proper positioning of the shearing mirrors. The image space can also be effectively spliced together by adjusting the tilt and position of each shearing mirror. FIG. 9 shows the tiling of 2 DMD image spaces together in one axis to make a larger composite image on the powder bed surface. This can be extended to N×M DMD image spaces by compressing each DMD image with a reducing optic, shearing each reduced image together, then using a single lens to reimage or magnify the image back to the desired size.

Example 4

Figure 10:
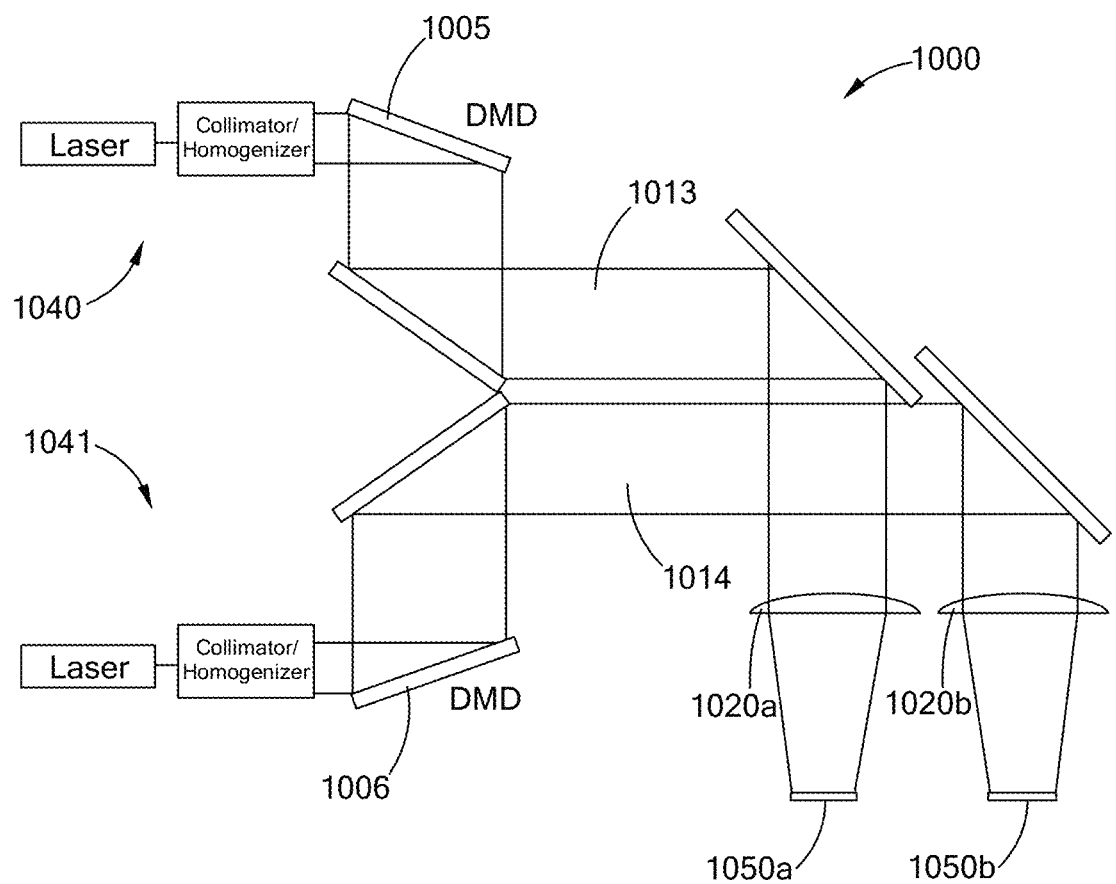
FIG. 10 is a schematic diagram of an embodiment of a multi-DMD laser printer system in accordance with the present inventions.

An embodiment of the present invention relates to using multiple DMD within different imaging apertures to create a parallel build capability. Turning to FIG. 10 there is shown a multi-DMD system 1000, which has a first DMD subsystem 1040 and a second DMD subsystem 1041 for providing two parallel build laser beams to create separate images on the powder bed. Subsystem 1040 has a DMD 1005 that is positioned along a laser beam path 1013. Subsystem 1040 provides image 1050a. Subsystem 1041 has a DMD 1006 that is positioned along a laser beam path 1014. Subsystem 1041 provides image 1050b.

Each DMD has its own laser source and the image space of each DMD is tiled on the surface of the powder bed creating a checkboard pattern of images and non-image areas. The build strategy can be to either use each single DMD image space to build an individual part. Or to use each individual DMD image space to build a larger part by building multiple sections in parallel.

A second, third or fourth set of systems extending into the paper or adjacent to the shown systems can be added to expand the addressable image area on the powder bed.

This system can have lens configurations that provide either an inverting or non-inverting image.

Example 5

An embodiment of the present invention relates to using laser beams having visible laser beams, and in particular having wavelengths from 350 nm to 700 nm, in additive laser manufacturing process, and in an additive laser manufacturing system, to build articles (e.g., structures, devices, components, parts, films, volumetric shapes, etc.) from raw materials, such as starting powders, nanoparticles, particles, pellets, beds, powder beds, spray powders, liquids, suspensions, emulsions and combinations and variations of these and other starting materials known, or later developed, in the laser additive manufacturing arts, including the 3-D printing arts.

Example 6

In an embodiment to build articles from raw materials in laser additive processes, wavelengths are used that have lower reflectivity, high absorptivity, and preferably both for the starting raw material. In particular, in an embodiment laser beam wavelengths are predetermined based upon the starting materials to preferably have absorption of about 10% and more, about 40% and more, about 50% and more, and about 60% and more, and in the range of 10% to 85%, 10% to 50%, about and about 40% to about 50%. In particular, in an embodiment laser beam wavelengths are predetermined based upon the starting materials to preferably have reflectivity's of about 97% and less, about 60% and less, about 30% and less, and in the range of 70% to 20%, in the range of 80% to 30%, and in the range of about 75% to about 25%. In embodiments combinations of both these high absorptions and these low reflectivities can be present. In a preferred embodiment of the systems and processes, the laser beam or beams have wavelengths from about 400 nm to about 500 nm are used to build articles from starting materials made up of gold, copper, brass, silver, aluminum, nickel, alloys of these metals, and other metals, non-metals, materials, and alloys and combinations and variations of these.

Example 7

In an embodiment the use of blue lasers, e.g., about 380 nm to about 495 nm wavelength, to additive manufacture articles from gold, copper, brass, nickel, nickel plated copper, stainless steel, and other, materials, metals, non-metals and alloys, is preferred. Blue laser beams are highly absorbed by these materials at room temperature, e.g., absorptivities of greater than about 50%. One of several advantages of the present inventions is the ability of a preselected wavelength laser beam, such as the blue laser beam, that is better able to better couple the laser energy into the material during the laser operation, e.g., the additive manufacturing process. By better coupling the laser energy to the material being built into an article, the chance of a runaway process, which typically can occur with the infrared lasers is greatly reduced and preferably eliminated. Better coupling of the laser energy also allows for a lower power laser to be used, which provides capital cost savings or enables multi-laser systems to be cost effective. Better coupling also provides for greater control, higher tolerances and thus greater reproducibility of built articles. These features, which are not found with IR lasers and in IR laser additive manufacturing operations, are important, to among other products, products in the electronics, micro-mechanical systems, medical components, engine components and power storage fields.

Example 8

In an embodiment a blue laser that operates in a CW mode is used. CW operation can be preferred over a short pulse laser, in many additive manufacturing applications, because of the ability to rapidly modulate the laser output and control the building process in a feedback loop, resulting in a highly repeatable process with optimum mechanical and other physical and esthetic properties, such as reduced surface roughness, improved porosity and improved electrical characteristics.

Example 9

Preferably, in some embodiments active monitoring of the article being build is used to check the quality of the article and the efficiency of the additive manufacturing process and systems. For example, when the laser is processing a high resolution region of the part being printed, a thermal camera can be used to monitor the average temperature of the surface and a feedback loop can be used to decrease or increase the laser power to improve the weld puddle and ultimately the surface quality of the part. Similarly, when the laser beam is defocused to sweep through a large low resolution region of the part, the feedback loop can command more laser power to keep the average temperature at the optimum processing point, greatly reducing the time to print a part.

Example 10

Examples of scanners and optics that can be used with the present systems include mirrors mounted on high speed motors, rotating polygon mirrors or high speed galvanometers. A mirror mounted on axis of a high speed motor can create a scanning beam as the mirror is rotated through 360 degrees. The higher the speed of the motor, the faster the scan. The only issue with this approach is that the laser must be turned off once the mirror is no longer reflecting the beam as the back side of the mirror passes by the laser beam entrance aperture. The high speed mirror can be used to scan either the x axis or the y axis, whichever axis is chosen, the mirror which scans the other axis must scan at a slow speed proportional to the time it takes to complete one full scan in the initial axis. It is preferred to use a high speed stepper motor in this axis to enable the mirror to be moved in discrete steps while remaining stationary while the first axis is completing its scan. Similarly, a multi-faceted mirror or polygon mirror can be used to perform the high speed scan function allowing higher scan speeds because the scan is reset to the starting position as the beam transitions across each facet of the mirror. These types of mirrors are currently being used in supermarket scanners to scan a product's bar code as it passes by. The primary axis can also be scanned with a high speed galvanometer type mirror which is a resonant type motor and oscillates at a continuous frequency producing high speed movement of the beam. It is also possible to precisely position galvanometer mirrors to a predetermined position, allow systems based on the first and second axis being a galvanometer driven mirror to draw in a vector mode where any point on the process bed can be rapidly addressed by simultaneously moving both mirrors. It is also feasible to combine mirrors mounted on translation stages in a "flying optic" type design where the beam is delivered through free space to a mirror mounted on a gantry style system and is moved in a two dimensional, raster or vector mode at very high speeds.

Example 11

Figure 11:
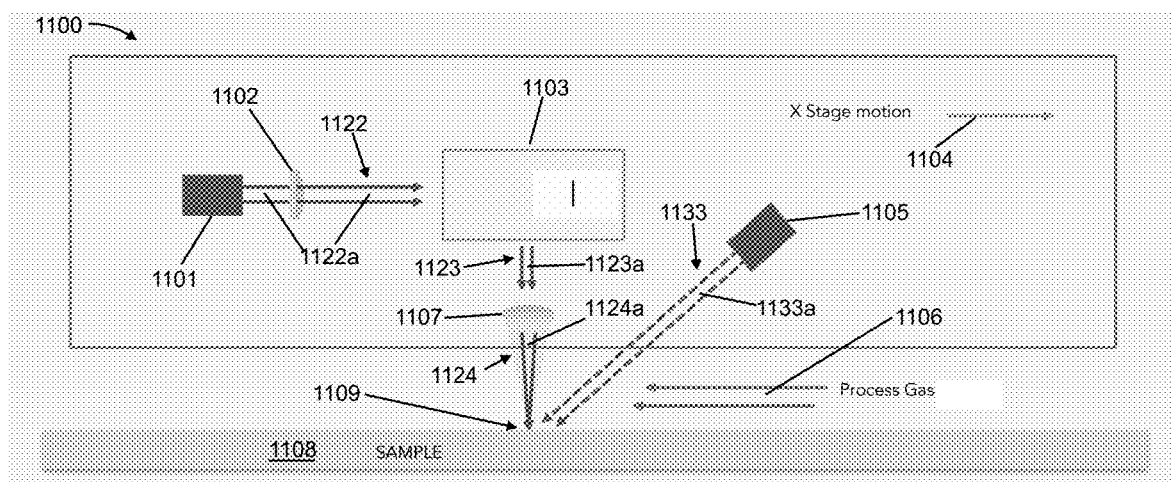
FIG. 11 is a schematic of an embodiment of a Digital Mirror Device based printing system, illustrating the scrolling of the image across the target substrate as the motion system moves in accordance with the present inventions.

Turning to FIG. 11 there is an embodiment of a laser system and method. The system 1100 has a laser source 1101 for providing a laser beam (shown by ray traces 1122) along a first lase beam path 1122a. The laser beam leaves the laser source 1101 and travels along beam path 1122a passing through collimation lens 1102 and entering Digital Mirror Device 1103, which directs the laser beam in a laser beam pattern (show by ray traces 1123) along laser beam path 1123a to a focusing lens 1107 and then as a focused laser beam pattern (show by ray traces 1124) along laser beam path 1124a to a sample 1108 (e.g., metal powder bed, starting material, staring powder bed, or build material) to a target location 1109. There is also shown the flow of process gas (e.g., inert gas, such as argon) toward and over the target area 1109. In this manner the system uses the Digital Mirror Device 1103 to provide a laser patent to build an object, (e.g., a metal object, such as a copper part) in a volumetric shape as defined by the laser pattern delivered to the target from the Digital Mirror Device.

The system has a warming laser 1105 that provides a warming laser beam (shown by ray traces 1133) along laser beam path 1133a. The movement of the stage holding the Digital Mirror Device 1103 is in the direction shown by arrow 1104.

Example 12A

In an embodiment of the system of Example 12, the laser source 1101 is a blue laser providing a laser beam having the parameters of one of the lasers in Table 1 and Table 2.

TABLE 1

| Optical (Typical) | Units | AO-200 | AO-650 | AI-1500 |
| --- | --- | --- | --- | --- |
| Wavelength | nm | ~450 | ~450 | ~445 |
| Bandwidth | nm | ~10 | ~10 | ~10 |
| Output Power | W | 200 | 650 | 1500 |
| Power Adjustment | % | 0-100 | 0-100 | 0-100 |
| Power Stability (8 hours) | % | <3% at full power | <3% at full power | <3% at full power |
| Fiber Diameter (Core) | μm | 200 | 400 | <125 |
| Fiber Numerical Aperture | N/A | 0.22 | 0.22 | 0.22 |
| Beam Product Parameter | mm-mrad | <15 | <30 | <11 |
| Standard Fiber Length-Connector Type | m | 5-QBH | 5-QBH | 5-QBH |

TABLE 2

| Optical | Units | AO-150 Typical | AO-500 Typical |
| --- | --- | --- | --- |
| Wavelength | nm | ~450 | ~450 |
| Bandwidth | nm | ~10 | ~10 |
| Output Power | W | 150 | 500 |
| Power Adjustment | % | 0-100 | 0-100; Automated Power Control Mode |
| Power Stability (8 hours) | % | <3% at full power | <3% at full power |
| Fiber Diameter (Core) | μm | 200 | 400 |
| Fiber Numerical Aperture | NA | 0.22 | 0.22 |
| Minimum focus at f = 100 mm | μm | 100 | 200 |

TABLE 2-continued

| Optical | Units | AO-150 Typical | AO-500 Typical |
|---|---|---|---|
| Beam Product Parameter | mm-mrad | <15 | <30 |
| Standard Fiber Length-Connector Type | m | 5-QBH | 5-QBH |

The focal lens is a 100 mm focal length.

The Digital Mirror Device is a DMD or a MEMS. In an embodiment the DMD has an array of movable mirrors, which correspond to pixels, of 1920×1080.

The warming laser 1105 provides a beam having the properties of the AO-150 of Table 2.

Example 12B

The system of Examples 12A or 12B stores images of the object to be built from the metal starting material powder base 1108. These images are stored in sequence and played back synchronized to the movement 1104 of the stage. The fusing of the metal powder base to form the build object is by conduction mode welding. The peak power of laser 1101 is 80 W, the stage speed is 5 mm/sec and the powder layer is 100 μm.

Example 13

Embodiments of the present systems, are non-macro-mechanical motion beam steering devices. For example, these embodiments do not contain and do not require a scanner to build an object. Thus, for example, embodiments of Examples 1-12B and 14 to 18, can be non-macro-mechanical systems.

Example 14

The systems and methods of examples 1-13 where the build laser beam has a wavelength selected from one of the following wave lengths: the blue wavelength range, 400 nm, about 440 nm, 450 nm, and about 450 nm, 460 nm and about 460 nm, the green wavelength range, 515 nm, about 515 nm, 532 nm, about 532 nm, and the red wavelength range of 600 nm to 700 nm. And, were the build laser beam has one or more of the beam properties, e.g., power, power density, repetition rate, etc. set forth in these specifications.

Example 15

Figure 15:
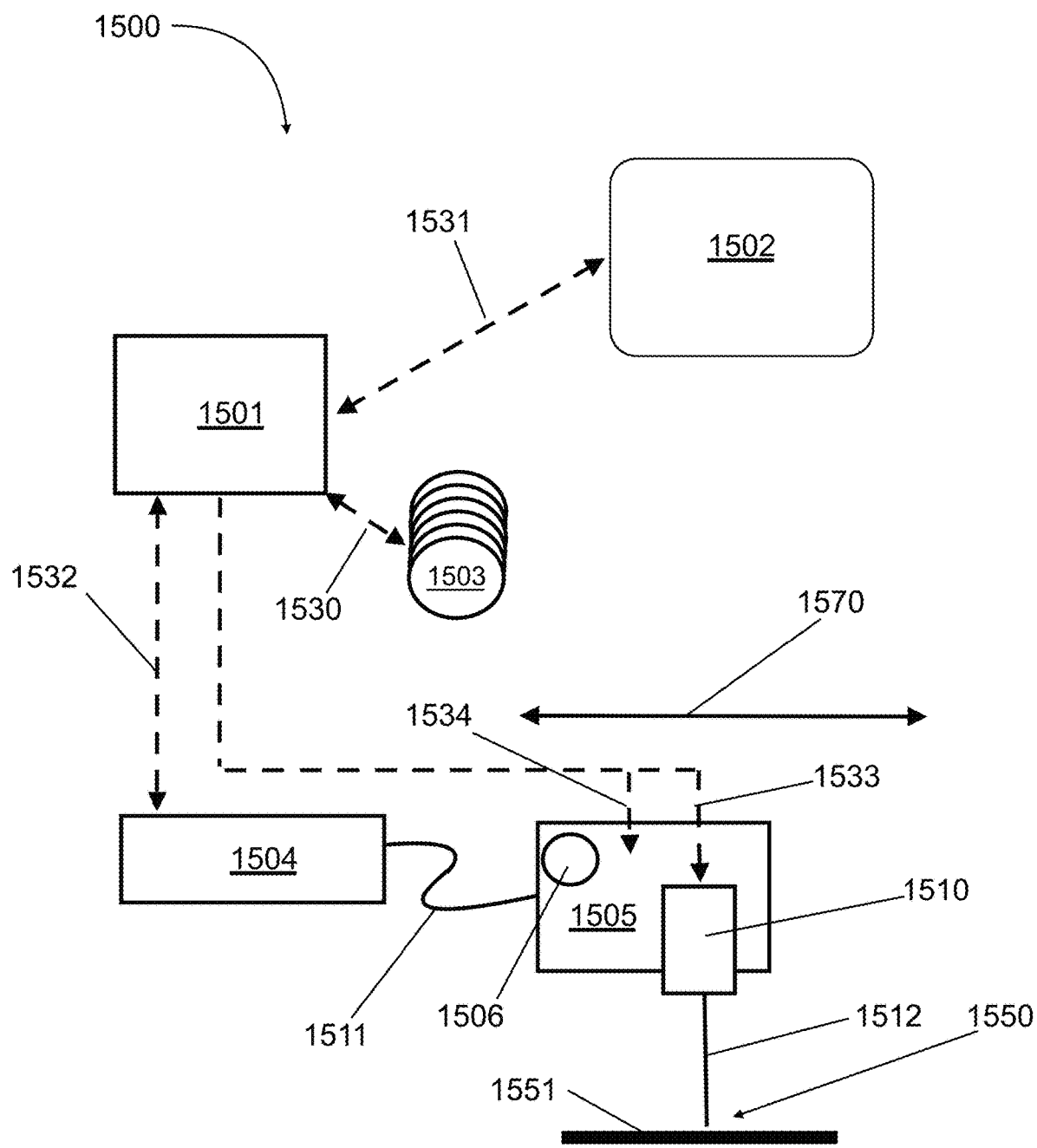
FIG. 15 is a schematic of an embodiment of a control system for use with the present systems and methods in accordance with the present inventions.

Referring to the schematic diagram of FIG. 15, an additive manufacturing system (1500) for metals, the system having: a laser source (1504), for providing a working laser beam; a Digital Mirror Device (1510) in optical communication with the laser source, whereby the laser source can propagate the working laser beam along a first laser beam path (1511) to the Digital Mirror Device; a control system (1501), in control communication (1530) with a memory device (1503); in control communication (1531) with a GUI (1502); in control communication (1533) with the Digital Mirror Device (1510); in control communication (1532) with the laser source (1504); and, in control communication (1534) with a stage (1505); the memory device comprising a plurality of image segments of an entire image of an object to be built; the stage (1505) comprising a motor (1506) and the Digital Mirror Device (1510); wherein the Digital Mirror Device is configured to project the working laser beam in a predetermined pattern along a second laser beam path (1512) to a target area (1550), wherein the target area comprises a powder (1551); wherein the predetermined pattern comprises the image segments; the control system comprising instructions, wherein the instructions synchronize the movement (1570) of the stage and the projection of the image segments to the target area; whereby the image segments are projected to the target area to deliver the working laser beam in the image of the entirety of the object to be built; thereby building the object from the powder.

In an embodiment the control system and control communication of this example 15 is used with the systems of Examples 1 to 14.

Example 16

An additive manufacturing system (1500) for metals, the system having: a laser source (1504), for providing a working laser beam; a Digital Mirror Device (1510) in optical communication with the laser source, whereby the laser source can propagate the working laser beam along a first laser beam path (1511) to the Digital Mirror Device; a control system (1501), in control communication (1530) with a memory device (1503); in control communication (1533) with the Digital Mirror Device (1510); and, in control communication (1534) with a stage (1505); the memory device comprising a plurality of image segments of the entirety of an object to be built; the stage (1505) comprising the Digital Mirror Device (1510); wherein the Digital Mirror Device is configured to project the working laser beam in a predetermined pattern along a second laser beam path (1512) to a target area (1550); wherein the predetermined pattern comprises the image segments; the control system comprising instructions, wherein the instructions synchronize the movement (1570) of the stage and the projection of the image segments to the target area; whereby the image segments are projected to the target area to provide an image of the entirety of the object to be built.

In an embodiment the control system and control communication of this example 16 is used with the systems of Examples 1 to 14.

Example 17

An additive manufacturing system (1500) for metals, the system having: a laser source (1504), for providing a working laser beam; a Digital Mirror Device (1510) in optical communication with the laser source, whereby the laser source can propagate the working laser beam along a first laser beam path (1511) to the Digital Mirror Device; a control system (1501), in control communication (1530) with a memory device (1503); in control communication (1533) with the Digital Mirror Device (1510); and, in control communication (1534) with a stage (1505); the memory device comprising a plurality of image segments, wherein the image segments define an entire image of an object to be built; the stage (1505) comprising the Digital Mirror Device (1510); wherein the Digital Mirror Device is configured to project the working laser beam in a predetermined pattern along a second laser beam path (1512) to a target area (1550), wherein the predetermined pattern comprises the image segments; the control system comprising instructions, wherein the instructions synchronize the movement (1570) of the stage and the projection of the image segments to the target area; whereby the image segments are projected to the target area to deliver the working laser beam in the image of the entirety of the object to be built.

In an embodiment the control system and control communication of this example 17 is used with the systems of Examples 1 to 14.

Example 18

The systems and methods of Examples 1-17 where the laser source is one or more of the lasers disclosed in this Specification.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

The various embodiments of systems, equipment, techniques, methods, activities and operations set forth in this specification may be used for various other activities and in other fields in addition to those set forth herein. Among others, embodiments of the present inventions can be used with the methods, devices and system of Patent Application Publication Nos. WO 2014/179345, 2016/0067780, 2016/0067827, 2016/0322777, 2017/0343729, 2017/0341180, and 2017/0341144 the entire disclosure of each of which are incorporated herein by reference. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combination, e.g., A, C, D, and A. A" C and D, etc., in accordance with the teaching of this Specification. Thus, the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

The invention claimed is:

1. An additive manufacturing system for metals, the system comprising:
   a. a laser source, for providing a working laser beam;
   b. a Digital Mirror Device in optical communication with the laser source, whereby the laser source can propagate the working laser beam along a first laser beam path to the Digital Mirror Device;
   c. a control system, in control communication with a memory device; in control communication with a GUI; in control communication with the Digital Mirror Device; in control communication with the laser source; and, in control communication with a stage;
   d. the memory device comprising a plurality of image segments of an entire image of an object to be built;
   e. the stage comprising a motor and the Digital Mirror Device;
   f. wherein the Digital Mirror Device is configured to project the working laser beam in a predetermined pattern along a second laser beam path to a target area, wherein the target area comprises a powder;
   g. wherein the predetermined pattern comprises the image segments;
   h. the control system comprising instructions, wherein the instructions synchronize the movement of the stage and the projection of the image segments to the target area;
   i. whereby the image segments are projected to the target area to deliver the working laser beam in the image of the entirety of the object to be built; thereby building the object from the powder.

2. The additive manufacturing system of claim 1, wherein the Digital Mirror Device is selected from the group consisting of a Digital Micromirror Device and Micro-Electro-Mechanical-System.

3. The laser systems of claims 1 and 2 wherein the working laser beam has a wavelength of in the range of 300 nm-800 nm.

4. The laser systems of claims 1 and 2 wherein the working laser beam has a wavelength of in the range of 300-600 nm.

5. The laser systems of claims 1 and 2 wherein the working laser beam has a wavelength of in the range of 400-500 nm.

6. The laser systems of claims 1 and 2 wherein the working laser beam has a wavelength of in the range of 500-600 nm.

7. The laser systems of any of claims 1 to 6, wherein the Digital Mirror Device is air cooled.

8. The laser systems of any of claims 1 to 6, wherein the Digital Mirror Device is cooled by a cooling device selected from the group consisting of a micro-channel cooler, water heat exchanger, and a Peltier cooler.

9. The laser systems of any of claims 1 to 8, further comprising zonal radiant heaters for maintain the build chamber temperature.

10. The laser systems of any of claims 1 to 9, further comprising a heated build plate.

11. The laser systems of any of claims 1 to 10, further comprising a separate secondary laser for heating the powder bed only where the pattern will be illuminated.

12. The laser systems of any of claims 1 to 11, further comprising an inert atmosphere.

13. He laser systems of any of claims 1 to 12, wherein the predetermined pattern has a multi-kW power density.

14. The laser systems of any of claims 1 to 13, wherein the system is non-macro-mechanical motion beam steering system.

15. The method of operating any of the systems of claims 1 to 14 to build an object from a metal powder.

16. The method of claim 15, wherein the metal powder is selected from the group consisting of gold, silver, platinum, copper and aluminum and alloys thereof.

17. An additive manufacturing system for metals, the system comprising:
   a. a laser source, for providing a working laser beam;
   b. a Digital Mirror Device in optical communication with the laser source, whereby the laser source can propagate the working laser beam along a first laser beam path to the Digital Mirror Device;
   c. a control system, in control communication with a memory device; in control communication with the Digital Mirror Device; and, in control communication with a stage;
   d. the memory device comprising a plurality of image segments of the entirety of an object to be built;
   e. the stage comprising the Digital Mirror Device;
   f. wherein the Digital Mirror Device is configured to project the working laser beam in a predetermined pattern along a second laser beam path to a target area;
   g. wherein the predetermined pattern comprises the image segments;
   h. the control system comprising instructions, wherein the instructions synchronize the movement of the stage and the projection of the image segments to the target area;
   i. whereby the image segments are projected to the target area to provide an image of the entirety of the object to be built.

18. The additive manufacturing system of claim 17, wherein the Digital Mirror Device is selected from the group consisting of a Digital Micromirror Device and Micro-Electro-Mechanical-System.

19. The additive manufacturing systems of claims 17 and 18 wherein the working laser beam has a wavelength of in the range of 300 nm-800 nm.

20. The laser systems of claims 17 and 18 wherein the working laser beam has a wavelength of in the range of 300-600 nm.

21. The additive manufacturing systems of claims 17 and 18 wherein the working laser beam has a wavelength of in the range of 400-500 nm.

22. The additive manufacturing systems of claims 17 and 18 wherein the working laser beam has a wavelength of in the range of 500-600 nm.

23. The laser systems of any of claims 17 to 22, wherein the Digital Mirror Device is air cooled.

24. The additive manufacturing systems of any of claims 17 to 22, wherein the Digital Mirror Device is cooled by a cooling device selected from the group consisting of a micro-channel cooler, water heat exchanger, and a Peltier cooler.

25. The additive manufacturing systems of any of claims 17 to 24, further comprising zonal radiant heaters for maintain the build chamber temperature.

26. The laser systems of any of claims 17 to 25, further comprising a heated build plate.

27. The additive manufacturing systems of any of claims 17 to 26, further comprising a separate secondary laser for heating the powder bed only where the pattern will be illuminated.

28. The additive manufacturing systems of any of claims 17 and 27, further comprising an inert atmosphere.

29. The additive manufacturing systems of any of claims 17 and 28, wherein the predetermined patter has a multi-kW power density.

30. The additive manufacturing systems of any of claims 17 and 29, wherein the system is non-macro-mechanical motion beam steering system.

31. The method of operating any of the systems of claims 17 to 30, to build an object from a metal powder.

32. The method of claim 31, wherein the metal powder is selected from the group consisting of gold, silver, platinum, copper and aluminum and alloys thereof.

33. The additive manufacturing system of any of claims 17 to 30, further comprising: the control system in control communication with a GUI.

34. The additive manufacturing system of any of claims 17 to 30 and 33 further comprising: the control system in control communication with the laser source.

35. The additive manufacturing system of any of claims 17 to 30 and 33 to 34, wherein the stage comprises a motor.

36. The additive manufacturing system of any of claims 17 to 32 and 33 to 35, wherein the target area comprises a powder.

37. The additive manufacturing system of any of claim 36, wherein the metal powder is selected from the group consisting of gold, silver, platinum, copper and aluminum and alloys thereof.

38. The additive manufacturing system of any of claims 36 to 37, whereby the image segments are projected to the target area to deliver the working laser beam in the image of the entirety of the object to be built; thereby building the object from the powder.

39. An additive manufacturing system for metals, the system comprising:
   a. a laser source, for providing a working laser beam;
   b. a Digital Mirror Device in optical communication with the laser source, whereby the laser source can propagate the working laser beam along a first laser beam path to the Digital Mirror Device;
   c. a control system, in control communication with a memory device; in control communication with the Digital Mirror Device; and, in control communication with a stage;
   d. the memory device comprising a plurality of image segments, wherein the image segments define an entire image of an object to be built;
   e. the stage comprising the Digital Mirror Device;
   f. wherein the Digital Mirror Device is configured to project the working laser beam in a predetermined pattern along a second laser beam path to a target area;
   g. wherein the predetermined pattern comprises the image segments;
   h. the control system comprising instructions, wherein the instructions synchronize the movement of the stage and the projection of the image segments to the target area;
   i. whereby the image segments are projected to the target area to deliver the working laser beam in the image of the entirety of the object to be built.

40. The additive manufacturing system of claim 39, wherein the Digital Mirror Device is selected from the group consisting of a Digital Micromirror Device and Micro-Electro-Mechanical-System.

41. The laser systems of claims 39 and 40 wherein the working laser beam has a wavelength of in the range of 300 nm-800 nm.

42. The laser systems of claims 39 and 40 wherein the working laser beam has a wavelength of in the range of 300-600 nm.

43. The laser systems of claims 39 and 40 wherein the working laser beam has a wavelength of in the range of 400-500 nm.

44. The laser systems of claims 39 and 40 wherein the working laser beam has a wavelength of in the range of 500-600 nm.

45. The laser systems of any of claims 39 and 40, wherein the Digital Mirror Device is air cooled.

46. The laser systems of any of claims 40 to 45, wherein the Digital Mirror Device is cooled by a cooling device selected from the group consisting of a micro-channel cooler, water heat exchanger, and a Peltier cooler.

47. The laser systems of any of claims 40 to 46, further comprising zonal radiant heaters for maintain the build chamber temperature.

48. The laser systems of any of claims 40 to 47, further comprising a heated build plate.

49. The laser systems of any of claims 40 to 48, further comprising a separate secondary laser for heating the powder bed only where the pattern will be illuminated.

50. The laser systems of any of claims 40 to 49, further comprising an inert atmosphere.

51. The laser systems of any of claims 40 and 50, wherein the predetermined patter has a multi-kW power density.

52. The laser systems of any of claims 40 and 51, wherein the system is non-macro-mechanical motion beam steering system.

53. The method of operating any of the systems of claims 40 and 52, to build an object from a metal powder.

54. The method of claim 53, wherein the metal powder is selected from the group consisting of gold, silver, platinum, copper and aluminum and alloys thereof.

55. The additive manufacturing system of any of claims 40 to 52, further comprising: the control system in control communication with a GUI.

56. The additive manufacturing system of any of claims 39 or 40, further comprising: the control system in control communication with the laser source.

57. The additive manufacturing system of any of claims 39 or 40, wherein the stage comprises a motor.

58. The additive manufacturing system of claims 39 or 40, wherein the target area comprises a powder.

59. The additive manufacturing system of claims 39 or 40, wherein the metal powder is selected from the group consisting of gold, silver, platinum, copper and aluminum and alloys thereof.

60. The additive manufacturing system claims 39 or 40, whereby the image segments are projected to the target area to deliver the working laser beam in the image of the entirety of the object to be built; thereby building the object from the powder.

* * * * *